United States Patent
Suzuki et al.

(10) Patent No.: US 7,328,213 B2
(45) Date of Patent: Feb. 5, 2008

(54) TRANSACTION PROCESSING METHOD, TRANSACTION CONTROL APPARATUS AND PROGRAM THEREOF

(75) Inventors: Masahiro Suzuki, Kawasaki (JP);
Kazuhiko Fujita, Kawasaki (JP);
Shinichi Kariya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 471 days.

(21) Appl. No.: 10/850,699

(22) Filed: May 21, 2004

(65) Prior Publication Data
US 2005/0004952 A1 Jan. 6, 2005

(30) Foreign Application Priority Data
Jul. 1, 2003 (JP) .............................. 2003-189312

(51) Int. Cl.
*G06F 17/30* (2006.01)
(52) U.S. Cl. .............................. 707/8; 707/10; 707/200
(58) Field of Classification Search ................ 707/1–2, 707/8, 10, 100, 103 Y–103 Z, 104.1, 200–202; 709/217, 219, 230–233, 203
See application file for complete search history.

(56) References Cited
U.S. PATENT DOCUMENTS
5,799,305 A * 8/1998 Bortvedt et al. .............. 707/10

6,330,582 B1 * 12/2001 Kuo et al. ................... 718/101
6,457,041 B1 * 9/2002 Hutchison ................... 709/203

(Continued)

FOREIGN PATENT DOCUMENTS
JP 07-262073 10/1995

(Continued)

OTHER PUBLICATIONS

Aidong Zhang et al. "global scheduling for flexible transactions in heterogeneous distributed database systems", IEEE transactions on knowledge and data engineering, vol. 13, issue: 3, 2001, pp. 439-450.*

(Continued)

*Primary Examiner*—Luke S Wassum
*Assistant Examiner*—Cheryl Lewis
(74) *Attorney, Agent, or Firm*—Greer, Burns & Crain, Ltd.

(57) ABSTRACT

A transaction of processing a database distributed to a plurality of servers in a chain of local transactions individually processed by and in each server. In each server, when the processing of a local transaction in the server is completed, the local transaction is committed or rolled back, and the right to execute a process of an application is released. Until all chained transactions are completed, the exclusive control of data accessed in the local transactions and the data before update of updated data is managed in a log, thereby guaranteeing the consistency and integrity of the data.

6 Claims, 20 Drawing Sheets

U.S. PATENT DOCUMENTS

| | | | |
|---|---|---|---|
| 7,103,586 B2 * | 9/2006 | Holenstein et al. | 707/1 |
| 7,103,597 B2 * | 9/2006 | McGoveran | 707/8 |
| 2002/0116205 A1 * | 8/2002 | Ankireddipally et al. | 705/1 |
| 2003/0046342 A1 * | 3/2003 | Felt et al. | 709/203 |
| 2003/0061256 A1 * | 3/2003 | Mathews et al. | 709/101 |
| 2006/0195579 A1 * | 8/2006 | Inoue | 709/226 |

FOREIGN PATENT DOCUMENTS

| | | | | |
|---|---|---|---|---|
| WO | WO 96/30847 | * | 10/1996 | 17/30 |
| WO | WO 02/093420 | * | 11/2002 | 17/30 |
| WO | WO 2004/071050 | * | 8/2004 | 29/6 |

OTHER PUBLICATIONS

Yan Liu et al. "evaluating the scalability of enterprise JavaBeans technology", proceedings of the ninth Asia-Pacific softwae engineering conference, 2002, pp. 1-10.*

M.C Little et al. "an examination of the transition of the Arjuna distributed transaction processing software from research to products", no date.*

S.Ramsay et al. "interactive simulation of distributed transaction processing commit prtocols", Apr. 1997.*

* cited by examiner

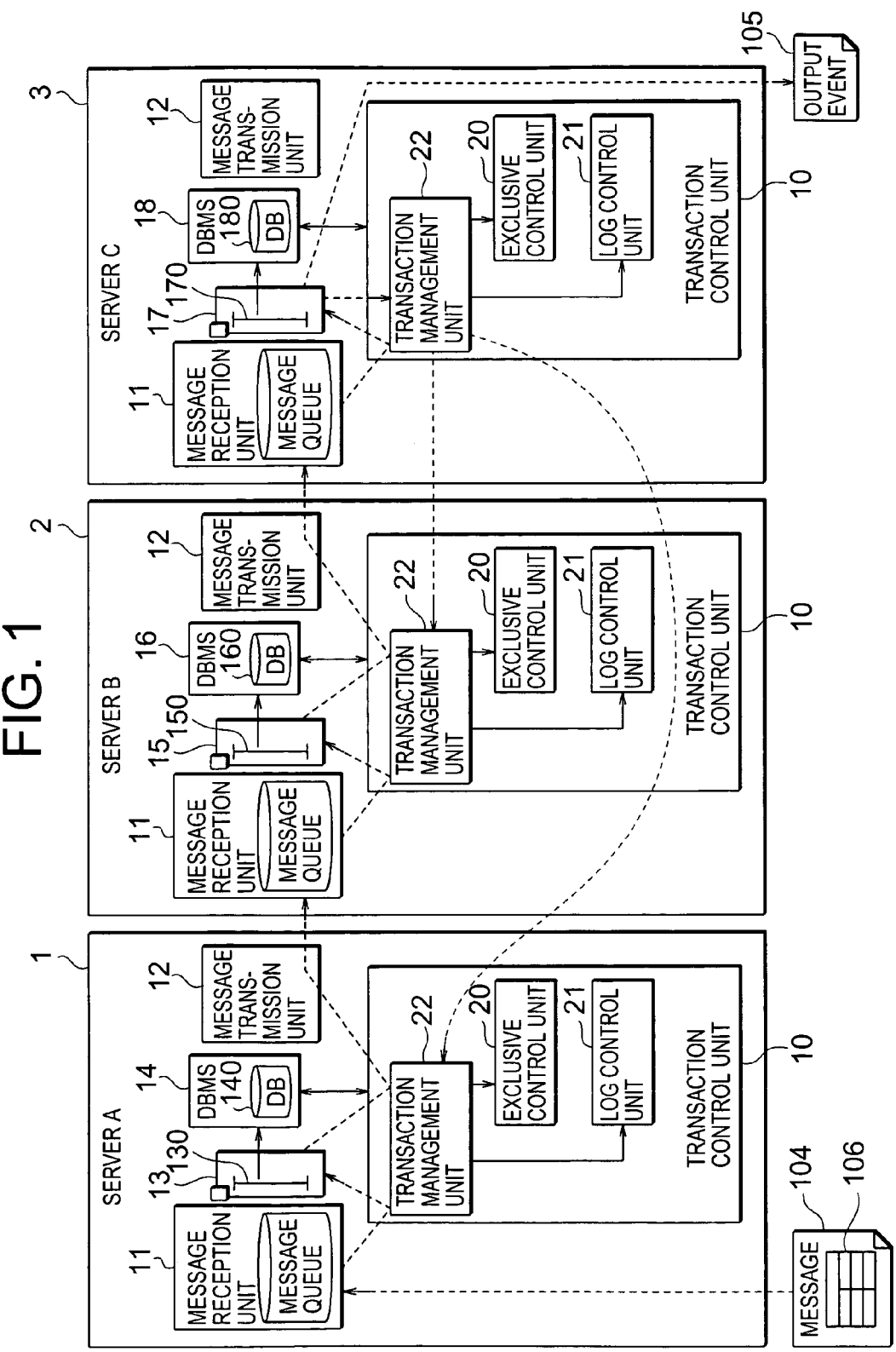

| [PROCESSING TYPE] | [PROCESSING RESULT] |
|---|---|
| PROCESSING A (SERVER A) | UNPROCESSED |
| PROCESSING B (SERVER B) | UNPROCESSED |
| PROCESSING C (SERVER C) | UNPROCESSED |

| [PROCESSING TYPE] | [PROCESSING RESULT] |
|---|---|
| PROCESSING A (SERVER A) | UNPROCESSED |
| ⋮ | ⋮ |
| ⋮ | ⋮ |

CHAINED TRANSACTION ID

FIG. 8A

| CHAINED TRANSACTION ID =192.231.6.2.1 | | 106 |
|---|---|---|
| [PROCESSING TYPE] | [PROCESSING RESULT] | |
| PROCESSING A (SERVER A) | UNPROCESSED | |
| PROCESSING B (SERVER B) | UNPROCESSED | |
| PROCESSING C (SERVER C) | UNPROCESSED | |

FIG. 8B

| CHAINED TRANSACTION ID =192.231.6.2.1 | | 106 |
|---|---|---|
| [PROCESSING TYPE] | [PROCESSING RESULT] | |
| PROCESSING A (SERVER A) | OK | |
| PROCESSING B (SERVER B) | UNPROCESSED | |
| PROCESSING C (SERVER C) | UNPROCESSED | |

FIG. 9A

| CHAINED TRANSACTION ID = 192.231.6.2.1 | | 106 |
|---|---|---|
| [PROCESSING TYPE] | [PROCESSING RESULT] | |
| PROCESSING A (SERVER A) | OK | |
| PROCESSING B (SERVER B) | OK | |
| PROCESSING C (SERVER C) | OK | |

FIG. 9B

| CHAINED TRANSACTION ID = 192.231.6.2.1 | | 106 |
|---|---|---|
| [PROCESSING TYPE] | [PROCESSING RESULT] | |
| PROCESSING A (SERVER A) | OK | |
| PROCESSING B (SERVER B) | OK | |
| PROCESSING C (SERVER C) | NG | |

FIG. 10

| [ITEM NAME] | [ACCESS MODE] | [CHAINED TRANSACTION ID] |
|---|---|---|
| ○○ | UPDATE | 192.231.6.2.1 |
| ⋮ | ⋮ | ⋮ |
| ⋮ | ⋮ | ⋮ |

| [ITEM NAME] | [LOG DATA] | [CHAINED TRANSACTION ID] |
|---|---|---|
| ○○○ | ○○○○○ | 192.231.6.2.1 |
| ⋮ | ⋮ | ⋮ |
| ⋮ | ⋮ | ⋮ |

142

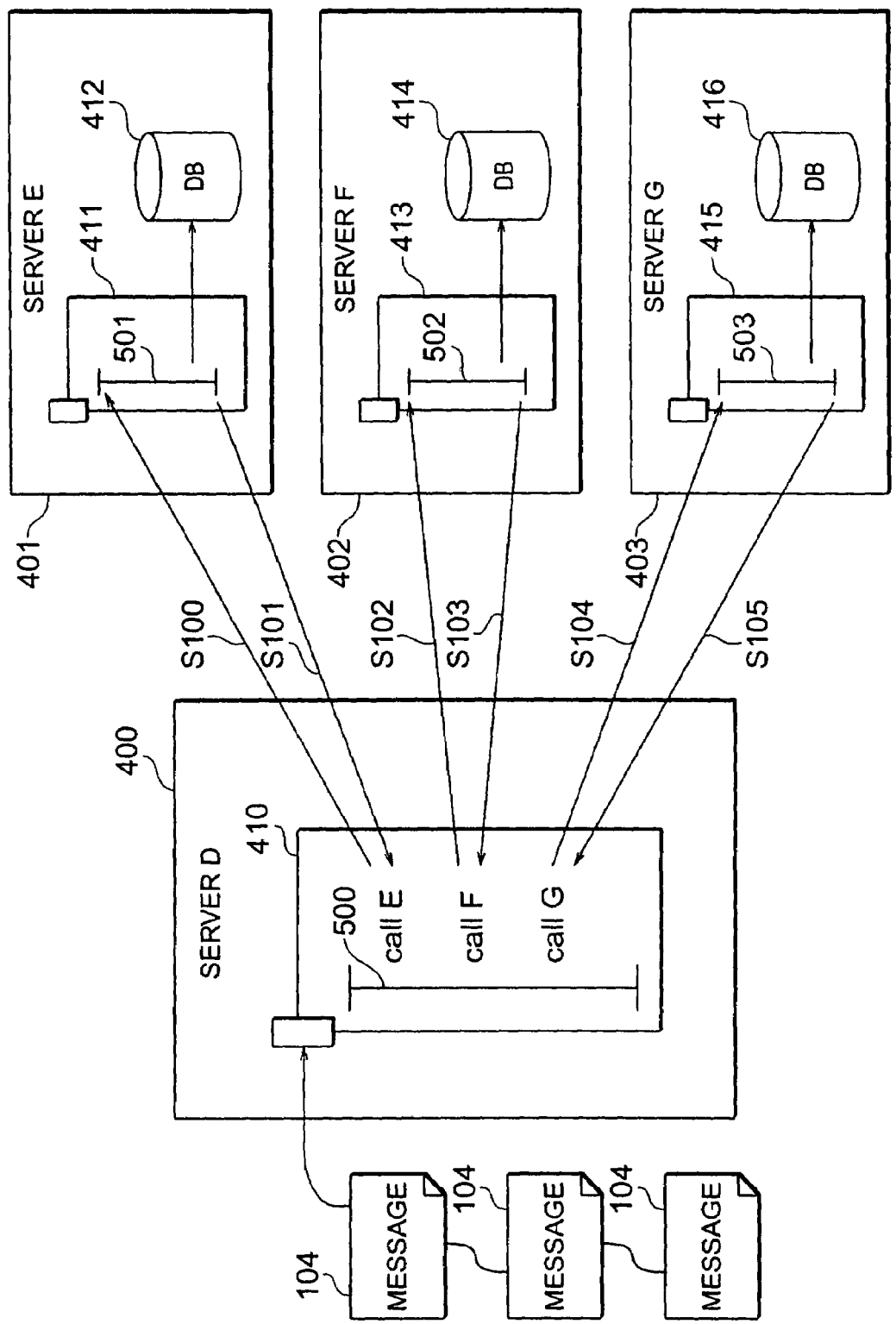

TRANSACTION PROCESSING METHOD, TRANSACTION CONTROL APPARATUS AND PROGRAM THEREOF

BACKGROUND OF THE INVENTION

1. Field of the Invention

This invention relates to a transaction processing method, a transaction control apparatus and a program thereof, and more specifically to a transaction processing method, a transaction control apparatus and a program thereof for improving the throughput of the transaction processing of the entire system in the transaction processing in which a database (DB) distributed to a plurality of servers is processed.

2. Description of the Related Art

There is a distributed transaction technology for processing a database of a plurality of servers in one transaction processing (for example, Japanese Patent Application Laid-Open No. 7-262073). In the conventional distributed transaction processing system, when a requested transaction (referred to as a global transaction) is processed, a main server requests one or more other servers to perform processing, and each of the requested servers perform requested processing, thereby performing transaction control in a 2-phase commitment system.

FIG. 22 shows the conventional distributed transaction technology including a server D 400, a server E 401, a server F 402, a server G 403, a message 104 which requests transaction processing, a process (hereinafter referred to as an executing process) 410 which performs transaction processing in the server D 400, an executing process 411 in the server E 401, a database (DB) 412 in the server E 401, an executing process 413 in the server F 402, a database 414 in the server F 402, an executing process 415 in the server G 403, and a database 416 in the server G 403.

Further, a global transaction 500 is processed in the executing process 410. Local transactions 501, 502 and 503 are individual transactions for performing processing assigned to the respective servers, and are processed in the executing processes 411, 413 and 415, respectively.

As shown in FIG. 22, the executing process 410 in the server D 400 receives the message 104, distributes necessary processing to the server E 401, the server F 402, and the server G 403 in the global transaction 500, performs the processing as a local transaction in each server, and receives a processing result from each server.

For example, the executing process 410 in the server D 400 receives the message 104, starts the global transaction 500, and requests the executing process 411 in the server E 401 to perform transaction processing using a processing request instruction (call E) when it is necessary to access the database 412 stored in the server E 401 (step S100). The executing process 411 accesses the database 412 by the local transaction 501, and returns the processing result to the executing process 410 (step S101).

Similarly, the executing process 410 requests the executing process 413 in the server F 402 and the executing process 415 in the server G 403 to perform transaction processing using, for example, "call F" and "call G", respectively (steps S102 and S104). And then, the executing process 410 receives a processing result of the local transaction 502 from the executing process 413, and receives a processing result of the local transaction 503 from the executing process 415 (steps S103 and S105).

The executing process 410 in the server D 400 receives a processing result from all executing processes (executing processes 411, 413 and 415) which are requested to perform transaction processing, and issues a commit command to each of the executing processes 411, 413 and 415 when the processing of all local transactions has been normally completed, thereby performing commitment.

On the other hand, based on the receipt of the processing result, when the executing process 410 in the server D 400 detects that an abnormal condition has occurred during the processing of the local transaction by any of the executing processes 411, 413 and 415, then the executing process 410 issues a rollback command to the executing processes 411, 413 and 415, thereby performing rollback.

When a series of processing is completely performed (after commitment or rollback) by the executing processes 411, 413 and 415, the executing process 410 is released.

In the above-mentioned conventional technology, the executing process of each server is not released until a series of processes of the related servers are all completed (commitment or rollback). For example, in FIG. 22, the executing process 410 in the server D400 is not released until the local transaction processing in each executing process in the servers E and F is committed or rolled back, and cannot start new transaction processing all that while.

Therefore, in the conventional technology, the multiprocessing level of the transactions cannot be enhanced, and the throughput of the entire system cannot be improved. Especially, with an increasing number of servers related to the processing, the processing time (time required to release the executing processes) of the executing process is prolonged, thereby causing the problem that the throughput of the entire system is lowered.

SUMMARY OF THE INVENTION

It is an object of the present invention to solve the above-mentioned problems of the conventional technology, and to provide a transaction processing method capable of suppressing the deterioration of the throughput (average processing time) of the transaction processing of the entire system even with an increasing number of servers relating to the transaction processing, and improving the response of the transaction in the distributed transaction processing.

It is another object of the present invention to provide a transaction control apparatus which improves the response of the transaction in the distributed transaction processing as described above.

It is still another object of the present invention to provide a transaction control program which improves the response of the transaction in the distributed transaction processing as described above.

It is still another object of the present invention aims at providing a computer readable recording medium recording the above-mentioned transaction control program.

A transaction processing method according to the present invention processes a transaction using a plurality of servers. The transaction processing method includes processing a first transaction as a chain of a plurality of second transactions, the first transaction processing a database distributed to the plurality of servers, each of the plurality of second transactions individually processing in each of the plurality of servers, and releasing a right to execute a process of processing a second transaction by each of the plurality of servers in a case that the processing of the second transaction in each of the plurality of servers is completed without waiting for synchronous completion of the second transaction processing in other servers of the plurality of servers.

A transaction control apparatus according to the present invention processes a transaction using a plurality of servers, the apparatus processing a first transaction as a chain of a plurality of second transactions, the first transaction processing a database distributed to the plurality of servers, each of the plurality of second transactions individually processing in each of the plurality of servers. The transaction control apparatus includes transaction management means for releasing a right to execute a process of processing a second transaction by each of the plurality of servers in a case that the processing of the second transaction in each of the plurality of servers is completed without waiting for synchronous completion of the second transaction processing in other servers of the plurality of servers, exclusive control means for recording exclusion information for the data of the database accessed in the second transaction, performing exclusive control on the data with another second transaction, discarding the recorded exclusion information and releasing the exclusive control in a case that the first transaction processing is completed, and log control means storing data before update of the data to be updated in the second transaction, discarding the stored data before update in a case that the processing of the first transaction normally terminates, restoring the database based on the stored data before update in a case that the processing of the first transaction abnormally terminates, and then discarding the recorded exclusion information and the stored data before update.

A transaction control program according to the present invention processes a transaction by a plurality of servers. The program causes a computer to execute processing a first transaction as a chain of a plurality of second transactions, the first transaction processing a database distributed to the plurality of servers, each of the plurality of second transactions individually processing in each of the plurality of servers, releasing a right to execute a process of processing a second transaction by each of the plurality of servers in a case that the processing of the second transaction in each of the plurality of servers is completed without waiting for synchronous completion of the second transaction processing in other servers of the plurality of servers.

A computer-readable recording medium according to the present invention records a transaction control program for processing a transaction by a plurality of servers. The program causes a computer to execute processing a first transaction as a chain of a plurality of second transactions, the first transaction processing a database distributed to the plurality of servers, each of the plurality of second transactions individually processing in each of the plurality of servers, and releasing a right to execute a process of processing a second transaction by each of the plurality of servers in a case that the processing of the second transaction in each of the plurality of servers is completed without waiting for synchronous completion of the second transaction processing in other servers of the plurality of servers.

BRIEF DESCRIPTION OF THE DRAWINGS

FIG. 1 shows an example of the structure of the system according to an embodiment of the present invention.

FIGS. 8A, 8B, 9A, and 9B show examples of chained transaction management tables.

FIG. 10 shows an example of an exclusion information table.

FIG. 12 shows an example of a log file.

FIG. 22 shows the conventional distributed transaction technology.

DETAILED DESCRIPTION OF THE PREFERRED EMBODIMENTS

Figure 2A:
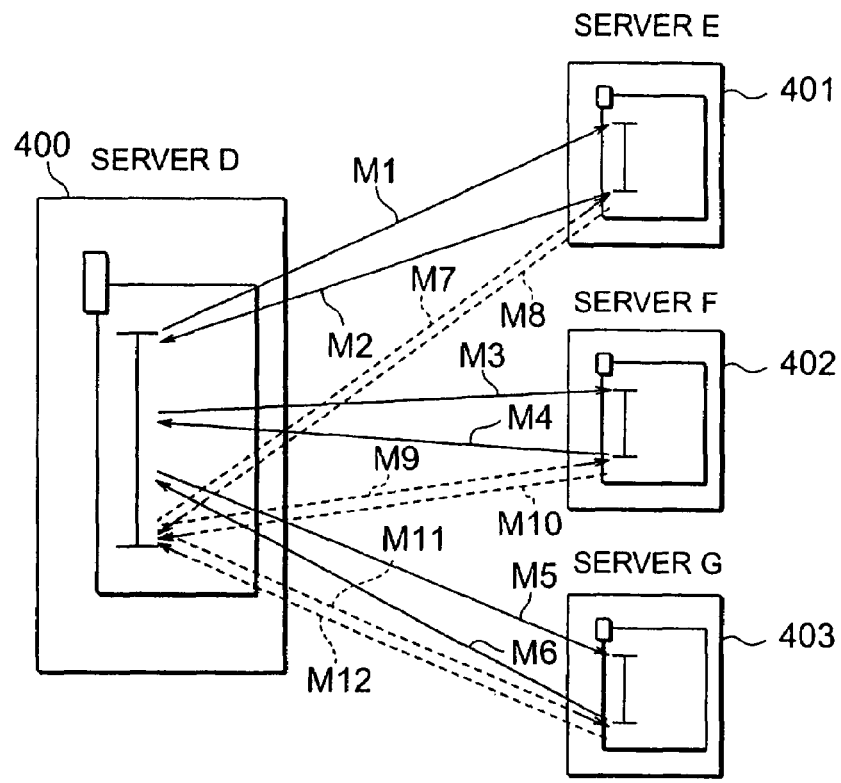
FIGS. 2A and 2B are explanatory views showing the comparison between the effect of the present invention and that of the conventional technology.

A major feature of the present invention is that, in a distributed transaction processing system for using a database distributed to a plurality of servers, each of the plurality of servers does not wait for synchronous completion of the transaction processing in other servers, and releases the right to execute a process of transaction processing at the time that the transaction processing in each server is completed.

The difference between the present invention and the conventional technology is described basically below. That is, in the conventional technology, a global transaction comprises a plurality of local transactions, and the process in which the global transaction and each local transaction are processed cannot receive a request to process the next transaction until all local transactions are committed or rolled back when an abnormal condition occurs in any local transaction.

On the other hand, according to the present invention, a transaction to be processed by a plurality of servers is processed in a chain of local transactions in each server, and a local transaction is committed or rolled back immediately after transaction processing is completed in each server. As a result, the server is ready to newly receive another transaction processing request.

Furthermore, according to the present invention, a chain of all local transactions (hereinafter referred to as chained transactions) are managed, and data accessed in a local transaction is exclusively controlled and the log of the data before update is stored until the processing of chained transactions is completed. When all processing of chained transactions normally terminates, the exclusive control is released and the log is deleted. When an abnormal condition occurs in any local transaction in the chained transactions, the related updated data is restored to the state before processing the chained transactions using the log of the data before update.

That is, in the conventional global transaction, the commit processing of the global transaction and the commit processing of each local transaction are synchronously performed. On the other hand, in the transaction processing method according to the present invention, the commit processing of each local transaction is performed sequentially and asynchronously.

The embodiment of the present invention is described below by referring to the attached drawings. FIG. 1 shows the outline of the present invention, and shows a server A 1, server B 2 and server C 3.

In the server A 1, a transaction control unit 10 has the function of controlling chained transactions which are formed by a series of local transactions and processed by a plurality of servers, a message reception unit 11 receives a message of a transaction processing request, a message transmission unit 12 transmits a message, an application process 13 processes a local transaction in the server A 1, and a database management system (DBMS) 14 is provided.

The transaction control unit 10 includes an exclusive control unit 20 for managing exclusion information, a log control unit 21 for managing data before update of a database (DB) 140 as log data, and a transaction management unit 22 for scheduling an application, exclusive control/log control, etc.

A message queue 110 stores the message 104 received by the message reception unit 11. A database (DB) 140 is managed by the DBMS 14. A message 104 is an input event of a transaction processing request. A reference numeral 105 denotes an output event. A chained transaction management table 106 is provided in the message 104. A local transaction 130 executes a processing assigned to the server A 1.

The server B 2 has a structure similar to that of the server A 1 except an application process 15 which processes a local transaction in the server B 2, a DBMS 16 and a DB 160. The server C 3 has a structure similar to that of the server A 1 except an application process 17 which processes a local transaction in the server C 3, a DBMS 18 and a DB 180. A local transaction 150 executes processing assigned to the server B 2. A local transaction 170 executes processing assigned to the server C 3.

Before explaining each unit in detail, the outline of the process in the transaction processing system shown in FIG. 1 is briefly described below.

(1) Assume that the server A 1 receives the message 104 requesting database processing by a plurality of servers A 1 through C 3 as transaction processing. The transaction management unit 22 of the server A 1 adds a unique identifier to the transaction in the system. The identifier is referred to as a chained transaction ID.

(2) The transaction management unit 22 passes the message 104 to the application process 13. Then, the application process 13 starts the local transaction 130, and performs the processing requested by the message 104. In the local transaction 130, when the DB 140 is updated through the DBMS 14, the log control unit 21 obtains data before update and stores it with the chained transaction ID.

(3) When the processing of the DB 140 in the server A 1 described in the above item (2) is completed, the local transaction 130 (transaction provided by the resource manager of the DBMS 14) of the application process 13 is temporarily committed, and releases the right to execute the application process 13, thereby the other user can use the application process 13. That is, a new transaction processing request is acceptable.

(4) In the above item (3), the transaction of a resource manager is committed, but the series of data processing of chained transactions to be processed by a plurality of servers has not been completed. Therefore, it is necessary to protect the data updated in the above item (2) from being accessed by other users. Then, the exclusive control unit 20 for other user is provided to determine whether or not access can be allowed. The exclusive control unit 20 records the exclusive control information about the updated data until the chained transactions until the chained transactions are completed (commitment or rollback), and prohibits access from other transactions to the updated data.

(5) Passing processing from the server A 1 to the server B 2 is performed by the asynchronous message communications through the message transmission unit 12 and the message reception unit 11 conventionally. In the server B 2, as in the server A 1, the local transaction 150 performs the processing on the database 160. Furthermore, the processing is passed from the server B 2 to the server C 3 by the message communications.

(6) When a series of processing of chained transactions by a plurality of servers normally terminate, a notification of the processing result from the transaction management unit 22 of the server C 3 to the related server A 1 and the server B 2 is issued with the chained transaction ID specified. The transaction management units 22 of the server A 1 and the server B 2 which have received the notification discards the data before update and releases the exclusive control on the updated data based on the notified chained transaction ID (commitment of chained transactions).

(7) When a local transaction abnormally terminates for any reason in a series of processing by a plurality of servers in the above-mentioned chained transactions, the related servers are notified of the abnormal condition together with the chained transaction ID. The server receiving the notification of an abnormal condition restores the database based on the data before update, and then discards the data before update and releases the exclusive control on the updated data (rollback of chained transactions).

In the above-mentioned mechanism of processing, the commitment of the local transaction in each server is performed in an early stage without synchronization with the commitment of chained transactions, thereby improving the throughput of the entire system. Furthermore, aside the DBMS in each server, the exclusive control unit 20 performs exclusive control on the updated data and the log control unit 21 records and manages the data before update in the transaction control unit 10. Therefore, the consistency and correctness of the data processing by a plurality of servers can be guaranteed.

The application process 13 in the server A 1 (same with other servers) indicates the only active state in FIG. 1, for simple explanation. However, a plurality of processes can be activated. The method of implementing the transaction control unit 10 can be realized in various styles. For example, the transaction control unit 10 is implemented in the server system such that the transaction management unit 22, the exclusive control unit 20 and the log control unit 21 in the transaction control unit 10 can be realized by a reentrant program group, and all or a part of the programs can be operated in the same process as the application process 13. The program for realizing the transaction control unit 10 can also be provided as a library.

The method for realizing the system shown in FIG. 1 is described furthermore in detail. To inherit the processing among servers in the above-mentioned chained transactions, the chained transaction management table 106 is provided in the message 104. The chained transaction management table 106 may be first generated by a unit which requests its transaction processing, or by the transaction management unit 22 of the server which firstly receives a processing request (for example, the server A 1).

In the chained transaction management table 106, for example, routing information and processing result information are set, the routing information indicating the order of performing which processing by which server, and the processing result information indicating in each server whether processing of a local transaction has normally terminated (OK), any abnormal condition has occurred during the processing (NG) or no processing has been performed yet.

The message reception unit 11 of the server A 1 receives the message 104 and stores it in the message queue 110. The queued messages 104 are sequentially passed to the transaction control unit 10 starting from the head of the message queue 110. As necessary, the message distribution unit (not shown in the attached drawings) may perform message distribution processing depending on the processing contents set in the message 104, but the message distribution processing is similar to the conventional message control, and is not the essence of the present invention. Therefore, the detailed explanation is omitted here. It is also assumed that the guarantee of a message in the message communications has been realized by the conventional technology.

The transaction management unit 22 in the transaction control unit 10 which has received the message 104 generates a chained transaction ID which is an identifier uniquely specifying chained transactions, and sets it in the chained transaction management table 106 in the message 104. Then, the transaction management unit 22 passes the message 104 to the application process 13, and requests to process the local transaction 130 assigned to the server A 1.

The log control unit 21 of the transaction control unit 10 obtains the data before update from the DBMS 14 before the application process 13 updates the data of the DB 140, and manages the data before update as log data together with the chained transaction ID. The exclusive control unit 20 obtains and manages the exclusion information about the updated data for determination of accessibility when other users access the DB 140.

When the processing of the local transaction 130 assigned to the server A 1 normally terminates, the transaction management unit 22 in the transaction control unit 10 issues a commit command of the local transaction 130 to the DBMS 14, and releases the right to execute the process. Thus, the application process 13 can be ready to newly receive a transaction processing request.

The transaction management unit 22 transmits through the message transmission unit 12 the message 104 to the server for performing transaction processing after the server (to which the processing unit or the transaction management unit 22 in this case belongs, and hereinafter this server is called "current processing server"), according to the routing information set in the chained transaction management table 106.

For example, when routing information, in which the server B 2 is set as performing the next processing on the local transaction 130 processed by the server A 1, is set in the chained transaction management table 106, the transaction management unit 22 transmits the message 104 to the server B 2.

In the server B 2, as in the server A 1, the application process 15 processes the local transaction 150 assigned to the server B 2. The transaction management unit 22 of the server B 2 transmits the message 104 to, for example, the next server C 3 based on the setting contents of the chained transaction management table 106.

In the server C 3, the application process 17 receives the message 104 from the transaction management unit 22, and processes the local transaction 170 assigned to the server C 3. When the processing of the local transaction 170 assigned to the server C 3 normally terminates, the transaction management unit 22 in the transaction control unit 10 refers to the setting contents of the chained transaction management table 106, and confirms the server to perform processing next.

For example, when the transaction management unit 22 confirms that its current processing server (server C 3) is the last server to perform processing by referring to the setting contents of the chained transaction management table 106, then the transaction management unit 22 of the server C 3 issues to the transaction management units 22 of the server B 2 and the server A 1 which performed processing before its current processing server a commit command on the chained transactions which are a series of transactions processed by the servers A 1, B 2 and C 3.

Practically, the commit command on the chained transactions is performed by transmitting a result message which is formed by the information about the chained transaction ID and the information (OK) that the processing in its current processing server has normally terminated.

Upon receipt of this result message from the server C 3, the transaction management units 22 of the server A 1 and the server B 2 discard the log data (data before update) managed by the log control unit 21 and the exclusion information managed by the exclusive control unit 20 based on the chained transaction ID in the result message, and commit the chained transactions. By the discard of the exclusion information, the exclusive control is released. The output event 105 is output from the application process 17 of the server C 3.

When, for example, an abnormal condition occurs during processing of the local transaction 170 in the server C 3, the rollback processing relating to the current local transaction 170 is performed, and a restore command on the DB 140 and the DB 160 is issued to the transaction management units 22 of the server B 2 and the server A 1 which have performed processing before the server C 3 based on the setting contents of the chained transaction management table 106 of the server C 3.

Practically, the restore command is performed by transmitting a result message which is formed by the information about the chained transaction ID and the information (NG) that an abnormal condition has occurred during processing in its current processing server (server C 3).

In the server B 2 and the server A 1, the transaction management units 22 restore the DB 160 and the DB 140 using the log data managed by the log control units 21 based on the chained transaction ID contained in the result message. Then, the exclusive control units 20 discard the exclusion information.

Thus, according to the embodiment of the present invention, when the processing of the local transaction assigned to each server normally terminates, the server commits the local transaction, releases the right to execute the process, and commits the chained transactions based on the commit command from the server which has last performed processing when the chained transactions have normally terminated.

Therefore, the throughput (average processing time) of the chained transactions which are the transaction to be processed in the entire system having a plurality of servers can be improved without largely depending on the number of servers involved in the transaction processing.

FIG. 2 is an explanatory view of comparing the effect of the present invention with that of the conventional technology. According to the present invention, as described above, the local transaction of each server can be committed at an early stage, so that the throughput of the transaction processing in the entire system can be improved, and the response of the transaction can be improved by reducing the frequency of communications relating to the distributed transaction.

Figure 2B:
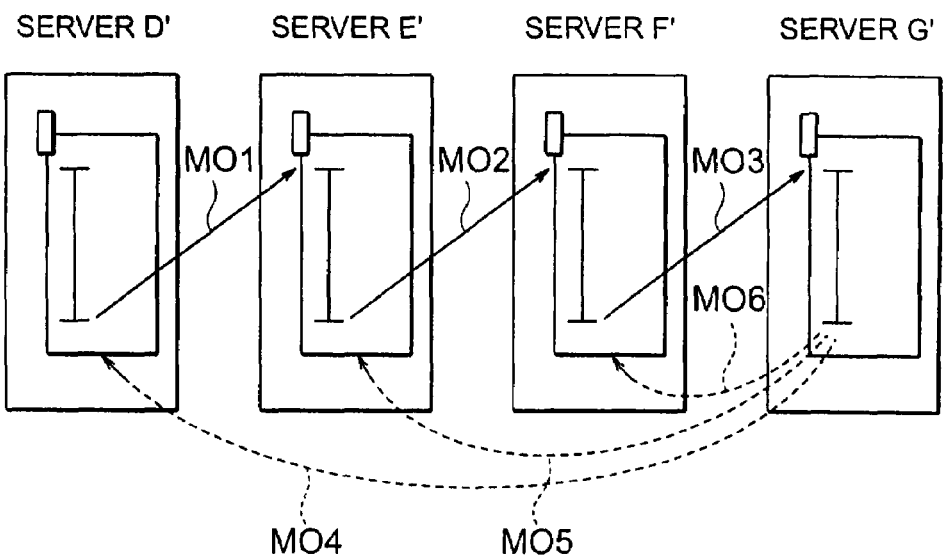

FIG. 2A shows the frequency of communications performed when the distributed transaction processing is performed by the conventional technology using four servers equal in number to the servers in the system structure of the conventional technology shown in FIG. 22. FIG. 2B shows the frequency of communications performed when the chained transaction processing according to the present invention is performed using four servers. In FIG. 2, a processing request message is shown as the characters M1, M3 and M5, a processing result message is shown as the characters M2, M4 and M6, a commit command message is shown as the characters M7, M9 and M11, a commit reply message is shown as the characters M8, M10 and M12, a processing transmission message is shown as the characters M01, M02 and M03, and a commit notification message is shown as the characters M04, M05 and M06.

In the conventional technology shown in FIG. 2A, as mentioned above by referring to FIG. 22, the frequency of communications reaches 12 from M1 to M12 until the global transaction of the server D400 is committed. On the other hand, according to the present invention, as shown in FIG. 2B, the time required in performing communications equals four times of the communicating time from M01 to M04, the time being measured after the chained transactions start in the server D' until the commit notification message M04 of the chained transactions is transmitted from the server G' to the server D' and the chained transactions are committed. Therefore, according to the present invention, as compared with the conventional technology shown in FIG. 2A, the delay by the communicating time in one transaction can be much reduced, thereby improving the response of a transaction. Furthermore, the amount of communications in the entire system in the conventional technology corresponds to the amount of communications of 12 times of communications, while the present invention indicates 6 times of communications including the commit notification messages M05 and M06 from the server G' to the server E' and server F', thereby further reducing the load of the network by the reduction in the amount of communications.

Figure 3:
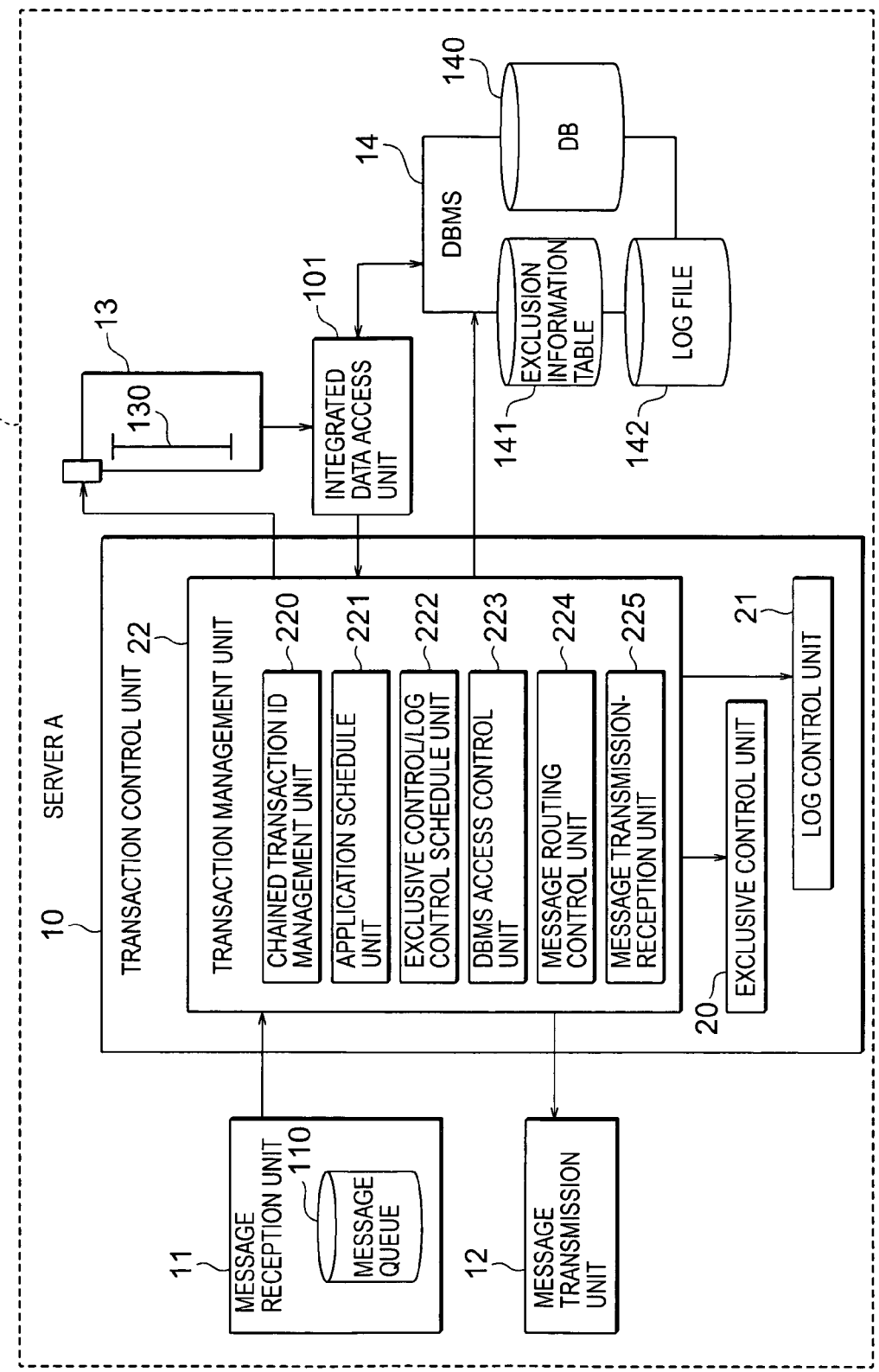
FIG. 3 shows the details of the structure of the system according to an embodiment of the present invention.

FIG. 3 shows the details of the structure of the system according to an embodiment of the present invention. The structure of the server A 1 is explained here for example. In FIG. 3, an integrated data access unit 101 receives a request from the application process 13 and accesses the DBMS 14. An exclusion information table 141 stores exclusion information. A log file 142 records data before update as log data.

In the transaction management unit 22, a chained transaction ID management unit 220 generates a chained transaction ID, an application schedule unit 221 schedules an application, and an exclusive control/log control schedule unit 222 schedules exclusive control/log control.

A DBMS access control unit 223 controls the access to the DBMS 14. A message routing control unit 224 controls the routing to which server the message 104 is to be transmitted. A message transmission-reception unit 225 transmits and receives the message 104 or a result message to and from another server.

The exclusive control unit 20 refers to and updates the exclusion information table 141, and determines the accessibility of another user. Although each server commits a local transaction, it is necessary to protect the updated data from access by other users because the chained transactions have not been completed. Therefore, the transaction control unit 10 has the exclusive control unit 20.

The exclusive control unit 20 manages exclusion information while the chained transactions are operating in addition to the exclusive control (among the local transactions). The exclusion information is stored in the exclusion information table 141 and managed as nonvolatile data. In the present embodiment, the exclusion information table 141 is generated in the same DBMS 14 as the DB 140, but it is obvious that the table can be stored on any other nonvolatile storage media.

The log control unit 21 obtains data before update (log) from the DBMS 14, and records it as log data in the log file 142. When an abnormal condition occurs in processing chained transactions, the data of the DB 140 can be restored based on this log data. In the present embodiment, for example, the log file 142 is stored in the same DBMS 14 as the DB 140, but it can also be generated on any other nonvolatile storage media, not being limited to the same DB 140.

The integrated data access unit 101 is not indispensable in the present invention, but is provided as means to make it possible to implement the chained transaction control and to access to the DB 140 from an application. The integrated data access unit 101 provides a system of accessing the DBMS 14 by specifying a record number or the item name of data without directly issuing an access instruction such as an SQL, etc. from the application process 13, that is, an application interface (API) exclusively for a data access device.

For example, the integrated data access unit 101 prepares or constructs an access instruction of the DBMS 14 based on the access request item received from the application process 13, and accesses the DBMS 14. The transaction management unit and the integrated data access unit of the server B 2 or the server C 3 have the same structures as the transaction control unit 10 and the integrated data access unit 101 of the server A 1 shown in FIG. 3.

Figure 4:
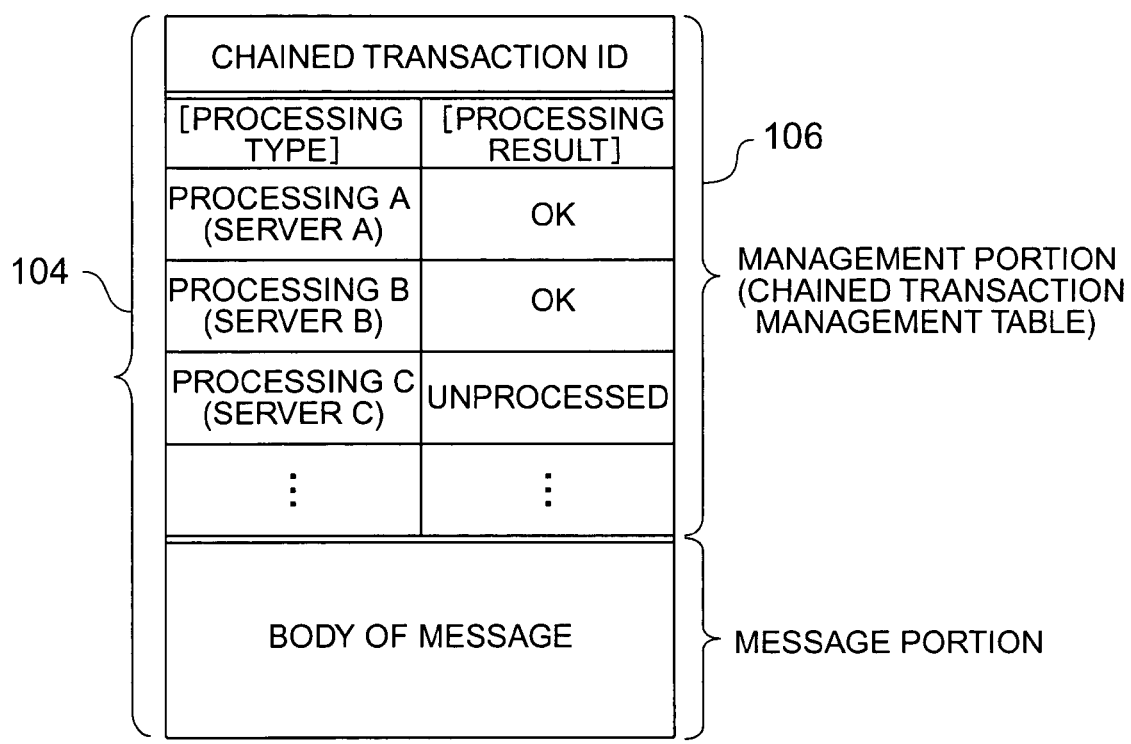
FIG. 4 shows the format of the message according to an embodiment of the present invention.

FIG. 4 shows the format of the message according to the embodiment of the present invention. The message 104 comprises a management portion configured by the chained transaction management table 106 and a message portion. The management portion (chained transaction management table 106) is configured by, for example, a set of items of a "chained transaction ID", which is an identifier uniquely specifying chained transactions, a "processing type" and a "processing result".

The processing setting in the item "processing type" of the chained transaction management table 106 is, for example, local transaction processing assigned to each server such as deposit processing, cash withdrawal processing, etc. Each processing is performed in the order setting in the item "processing type". Therefore, the item "processing type" of the chained transaction management table 106 provides the routing information as to which processing is to be performed in which order.

The item "processing type" may contain a practical process name or an identification number of processing. With the name of processing or the identification number of processing, the name or the identification number of the server which performs the processing may be set. In addition to the chained transaction management table 106, a table may be provided, the table storing correspondence information which includes the processing type information and the sever information indicating the server in which the processes is to be performed.

The item "processing result" of the chained transaction management table 106 contains a processing result of the processing setting in the item "processing type". For example, when the processing normally terminates, "OK" is set. When an abnormal condition occurs during processing, "NG" is set. When the processing has not been performed, then "unprocessed" is set.

For example, the settings in the management portion (chained transaction management table 106) shown in FIG. 4 includes as follows. That is, the server A 1 performed the processing A, then the server B 2 performed the processing B, they normally terminated the respective processing, the processing C to be performed after the processing B is to be performed by the server C 3, and the processing C has been unprocessed.

The message 104 is carried about among the processing (among a plurality of servers) operated in the chained transactions. The setting contents of the chained transaction management table 106 in the message 104 are updated in each server. For example, when the server C 3 normally terminates the processing C, "OK" is recorded in the item "processing result" of the processing C in the chained transaction management table 106 shown in FIG. 4.

Furthermore, for example, when an abnormal condition occurs during processing C by the server C 3, "NG" is recorded in the item "processing result" of the processing C in the chained transaction management table 106 shown in FIG. 4.

Therefore, the server which receives the message 104 can obtain the processing result information about the chained transactions and the routing information indicating which server performs the next processing etc., by referring to the setting contents of the chained transaction management table 106 in the message 104.

According to the embodiment of the present invention, for example, the routing information may be set in the chained transaction management table 106, the routing information indicating that the processing is to be performed in the order of the server A 1, the server B 2, and the server C 3.

Additionally, for example, in the server A 1, the message routing control unit 224 of the transaction management unit 22 can add/change the routing information according to the add/change information about the routing received from an application. That is, the application process 13 of the server A 1 may determine the processing (for example, the processing B of the server B 2) of the server to which the message 104 is next passed depending on the process contents of the application, notify the message routing control unit 224 of it, and dynamically set the information about the "processing B (server B)" in the chained transaction management table 106.

Figure 5:
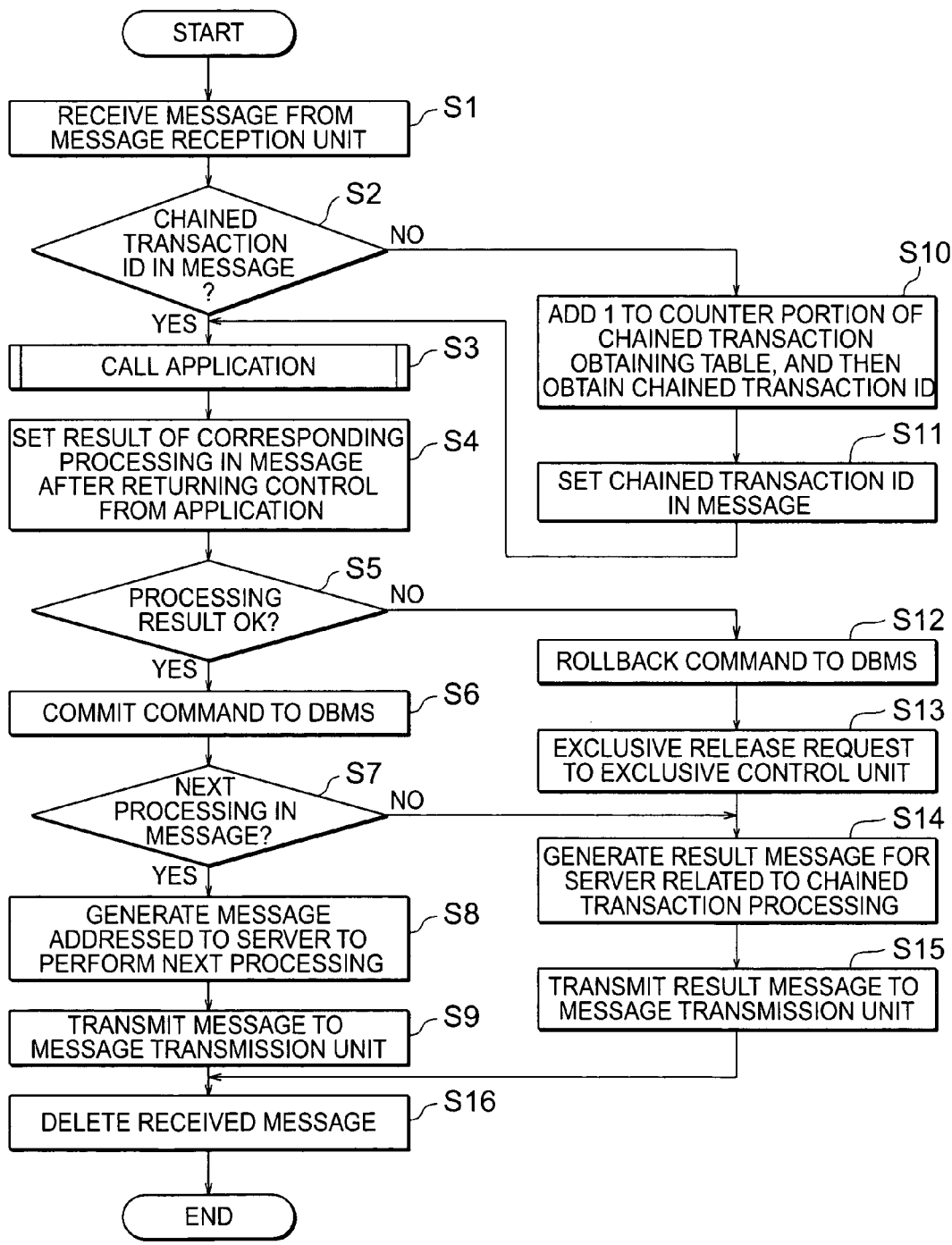
FIG. 5 shows an example of a flow of the transaction management processing by the transaction control unit.

FIG. 5 shows an example of the flow of the transaction management processing of the transaction control unit 10.

First, the transaction management unit 22 of the transaction control unit 10 receives the message 104 from the message reception unit 11 (step S1).

Figures 6A, 6B, 7:
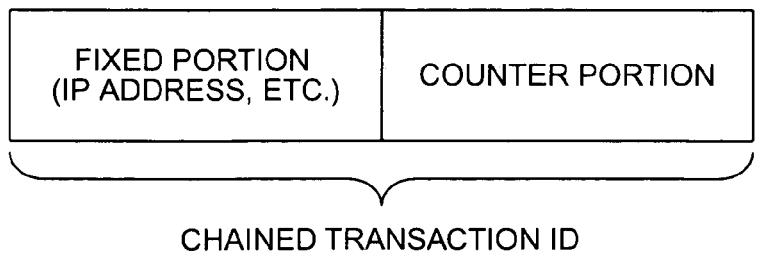
FIGS. 6A and 6B show examples of chained transaction management tables.
FIG. 7 shows an example of a chained transaction obtaining table.

The chained transaction management table 106 in the received message 104 contains the information that, for example, as shown in FIG. 6A, the server A 1 first performs the processing A which is not completed (or unprocessed). FIG. 6A shows the settings that after the server A 1 performs the processing A, the server B 2 performs the processing B, and then the server C 3 performs the processing C.

In the present invention, as shown in FIG. 6B, the chained transaction management table 106 may contains firstly the information only that the server A 1 performs the processing A, and the message routing control unit 224 in the server A 1 may dynamically set the routing information in the chained transaction management table 106 based on additional/change information of the routing from the process 13 of the application. The dynamic settings (add/change) of the routing information are described later.

According to another embodiment, the message 104 received by the first server A 1 possibly contains no chained transaction management table 106. In this case, the process contents in the server A 1 are determined from the contents of the process request in the body of the message, and the transaction management unit 22 generates the chained transaction management table 106 and adds it to the body of the message.

Then, it is determined whether or not there is a chained transaction ID in the message 104 (step S2). When there is no chained transaction ID, "1" is added to the counter portion of the chained transaction obtaining table, then the chained transaction ID is obtained (step S10) and is set in the message 104 (step S11), thereby passing control to step S3.

FIG. 7 shows an example of the chained transaction obtaining table. The chained transaction obtaining table is managed by the chained transaction ID management unit 220 of the transaction management unit 22.

The chained transaction ID comprises a fixed portion and a counter portion. In the fixed portion, a value for identification of the first server in which the chained transactions are operated. For example, an IP address, etc. is set. The fixed portion may be a server identification number.

The counter portion adds "1" by the trigger of obtaining the chained transaction ID. After the addition, the "fixed portion+counter portion" is managed as a chained transaction ID. By the processing in step S11, for example, as shown in FIG. 8A, the chained transaction ID "192.231.6.2.1" is set in the chained transaction management table 106.

In step S2, when there is a chained transaction ID in the message 104, an application is called (step S3), and the application is asked to perform the processing setting in the item "processing type" of the chained transaction management table 106. That is, the application process 13 is requested to perform the processing A. When the application process 13 performs the processing A and control is returned from the application process 13, the result of the processing is set in the message (step S4).

For example, when the processing A by the application process 13 of the server A 1 normally terminates, "OK" is set in the item of the "processing result" of the processing A of the chained transaction management table 106 as shown in FIG. 8B. When an abnormal condition occurs during the processing A by the server A 1, "NG" is set.

As described later, for example, when an add/change command on routing is issued from the application process 13, the routing information may be added/changed by adding/changing the setting contents of the item "processing type" of the chained transaction management table 106 in step S4.

Then, it is determined whether or not the processing result is OK (step S5). When the processing result is OK, a commit command is issued to the DBMS 14 (step S6), and control is passed to step S7.

In step S7, it is determined whether or not there is the next processing indicated in the message 104, that is, whether or not the processing to be next performed is set in the chained transaction management table 106.

When there is the next processing indicated in the message 104, the message 104 addressed to the server in which the next processing is performed is generated (step S8), and transmitted to the message transmission unit 12 (step S9).

For example, since it is understood from the setting contents in the chained transaction management table 106 shown in FIG. 8B that the server B 2 performs the processing B after the server A 1 performs the processing A, the transaction management unit 22 of the transaction control unit 10 transmits the message addressed to the server B 2 to the message transmission unit 12. Upon receipt of the message 104, the server B 2 performs the processing B.

After transmitting the message 104 in step S9, the received messages in the message reception unit 11 are deleted (step S16), thereby terminating the process.

The reason why the received messages are deleted in step S16 is described below. The message reception unit 11 according to the present embodiment stores the message queue 110 in a nonvolatile storage medium so that the messages cannot be lost in a case that the server goes down due to the fault of the system, thereby guaranteeing the user the integrity of the messages. The message guarantee mechanism is also used as the countermeasure against the fault during the message processing in the chained transactions. Therefore, although the transaction control unit 10 receives a message from the message reception unit 11 in the step S1, the received message is not deleted in the message queue 110, but is recorded as received. In addition to this, when the processing in the server is completed, the received messages are deleted (step S16). Thus, in a case that the server goes down due to any fault, it is determined whether or not the transaction processing has been performed in the server based on the presence/absence of the message 104 in the server when the server is activated again.

In step S7, when the next processing is not indicated in the message 104, a result message for the server relating to the chained transaction processing is generated (step S14). The result message in this case is used for issuing a commit command for the chained transactions, and is formed by the information about the chained transaction ID and the information that the processing in its current processing server has normally terminated (OK). Then, the result message is transmitted to the message transmission unit 12 (step S15), the processed received message is deleted (step S16), thereby terminating the process.

In step S5, when the result of the processing is NG, a rollback command is issued to the DBMS 14 (step S12), and an exclusion release request is issued to the exclusive control unit 20 (step S13). Then, the result message to the server relating to the chained transaction processing is generated (step S14).

In this case, the result message is used for designating the restoration of the database in the server related to the chained transaction processing, and is formed by the information about the chained transaction ID and the information (NG) that an abnormal condition has occurred during processing in its current processing server. Then, the result message is transmitted to the message transmission unit 12 (step S15), the received message is deleted (step S16), thereby terminating the process.

The processing in the server A 1 normally terminates, then the message 104 is transmitted to the server B 2, and then the processing B is performed in the server B 2. After that, when the message 104 is transmitted from the server B 2 to the server C 3 based on the setting contents of the chained transaction management table 106 in the processing in steps S7 to S9, the processing C is performed in the server C 3. When the processing C normally terminates in the server C 3, the contents shown in FIG. 9A are set in the chained transaction management table 106.

When the transaction management unit 22 of the server C 3 refers to the chained transaction management table 106 shown in FIG. 9A, and confirms that there is no subsequent processing indicated, that is, the current processing server C 3 is the last server to perform the processing, the result message is transmitted to the server B 2 and the server A 1 recorded as the servers which performed the processing before the current processing server C 3 in the chained transaction management table 106, and issues a commit command.

For example, when the processing assigned to each server is performed in the order of the server A 1, the server B 2, and server C 3, and when the processing result in the server C 3 is NG, "NG" is set in the item "processing result" of the processing C of the chained transaction management table 106 as shown in FIG. 9B.

In this case, the transaction management unit 22 in the server C 3 issues a rollback command to the DBMS 14, and an exclusion release request to the exclusive control unit 20. Then the transaction management unit 22 refers to the chained transaction management table 106 shown in FIG. 9B, and a result message for designation of the restoration of the database is transmitted to the server B 2 and the server A 1 which performed the processing before the current processing server C 3.

Described below is the exclusive control processing of the transaction control unit 10. The exclusive control processing according to the present embodiment may be performed in the same process as the application process 13, or the exclusive control processing may be performed by an independent server (exclusive server).

The input information of the present processing is, for example, the item name of an exclusive request, an access mode (reference or update) and a chained transaction ID. FIG. 10 shows an example of the exclusion information table 141 storing exclusion information managed by the exclusive control unit 20.

As shown in FIG. 10, the exclusion information is formed by, for example, a set of information including an item name, an access mode (reference or update) and a chained transaction ID. The item name of the exclusion information identifies the data which is an exclusive control unit of accessing in the DBMS, and may be a record identifier (record number, etc.) when exclusive control is performed in a record unit.

Figure 11A:
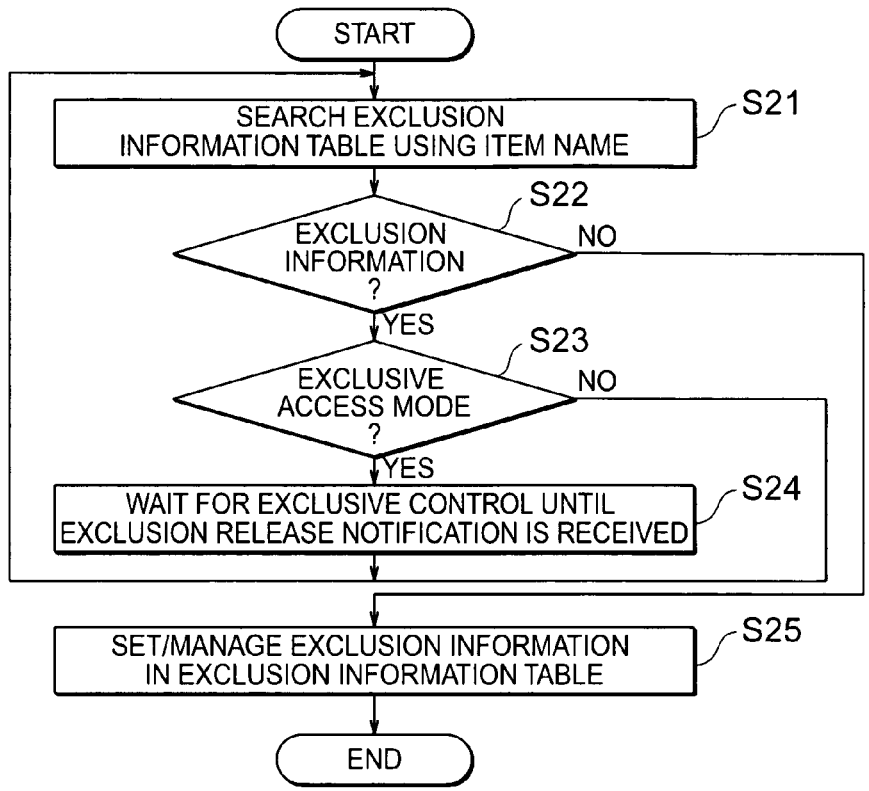
FIGS. 11A and 11B show examples of process flows of a transaction control unit and an exclusive control unit.

FIG. 11A shows a flow of processing of the operations of the transaction control unit 10 when exclusive control is obtained. The input information when a request to obtain exclusive control is obtained is the same with the exclusion information in the exclusion information table 141, so that the input information includes an item name, an access mode (reference or update) and a chained transaction ID. In response to a request to obtain exclusive control, the exclusive control unit 20 searches the exclusion information table 141 (step S21), and checks whether or not there is exclusion information having the same item name (step S22). When there is no corresponding exclusion information, exclusion information about input information is set in an empty entry of the exclusion information table 141 and managed (step S25), thereby terminating the exclusive control acquisition processing.

In the determination in step S22, when there are the exclusion information having the same item names, it is determined whether or not an access mode is exclusive (step S23). When at least one of the access modes of the input information and access modes of the exclusion information table 141 is "update", then it is determined that an exclusive access mode is set. It they are both "reference", then it is determined that an exclusive access mode is not set.

When it is not an exclusive access mode, control is returned to step S21, and corresponding exclusion information is searched. When it is determined that an exclusive access mode is set, exclusive control is awaited until an exclusion release notification is received (step S24), thereby returning control to step S21.

Figure 11B:
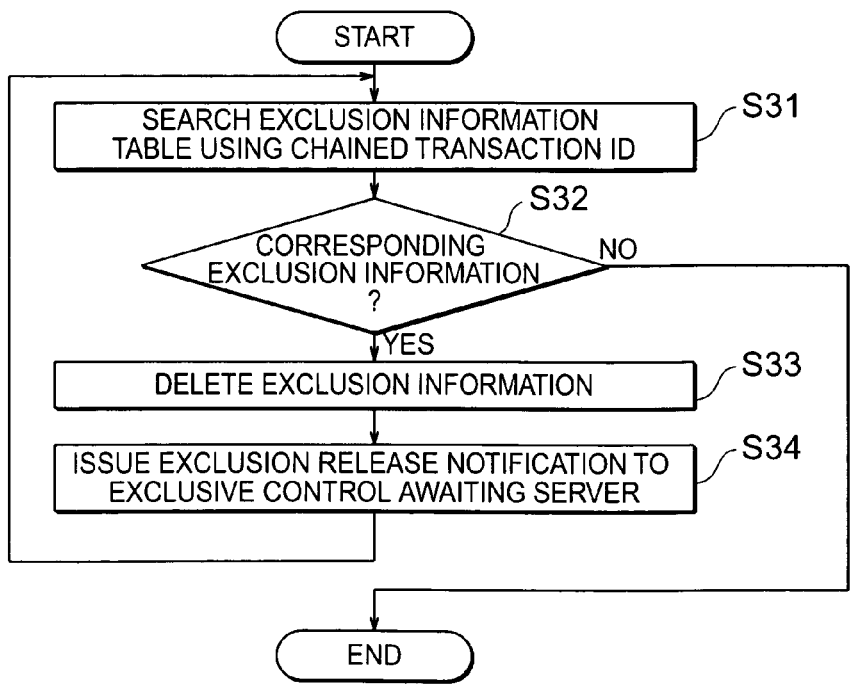

FIG. 11B is a flowchart showing the process flow of the operation of the transaction control unit 10 when exclusive control is released. The input information when exclusive control is released is a chained transaction ID. When exclusive control is released, the exclusive control unit 20 searches the exclusion information table 141 using the chained transaction ID as a key (step S31). When there is no exclusion information having the same chained transaction ID with that of the input information, the exclusive control release processing terminates (step S32). When there is exclusion information having the same chained transaction ID with that of the input information, the exclusion information is deleted from the exclusion information table 141 (step S33), and an exclusion release notification is issued to an exclusive control awaiting server or transaction control unit 10 (step S34). Then, control is returned to step S31, and the processing is repeated until the corresponding exclusion information is deleted.

Described below is the log control processing of the transaction control unit 10. In the log control processing, log data is managed and the DB 140 is restored based on the managed log data. As described above, the log file 142 in which the log (data before update) is managed is generated in advance in the same DBMS 14 as the DB 140 to be updated, and the log is managed as nonvolatile data.

The input information in this processing includes a chained transaction ID, an item name uniquely identifying the position information of the data before update, log data and a processing request (log write/log delete/DB recover). In the log file 142, as shown in FIG. 12, the chained transaction ID, the item name and the log data are managed.

Figure 13A:
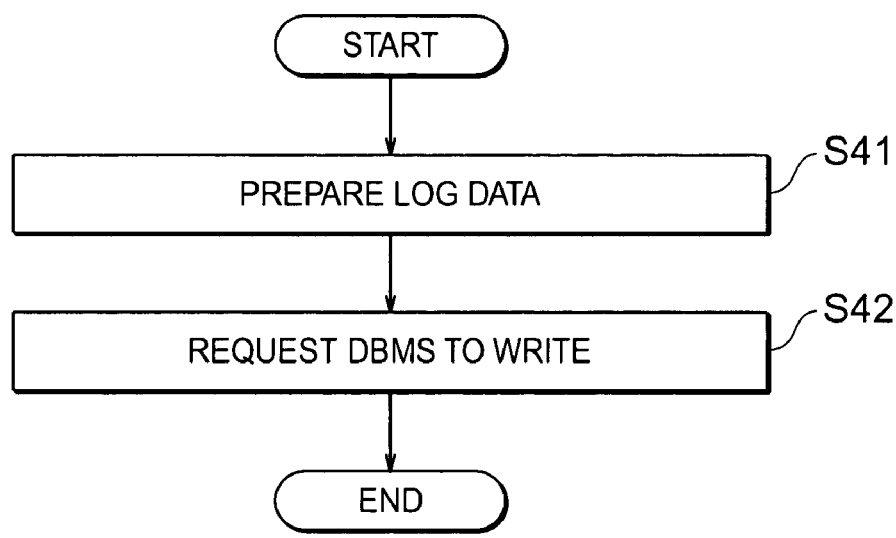
FIGS. 13A and 13B show examples of the flow of log write processing and log delete processing.

FIG. 13A shows an example of a flow of the log write processing by the log control unit 21 of the transaction control unit 10. First, the log control unit 21 prepares or constructs log data in response to a log write request (step S41), and issues a write request to the DBMS 14 (step S42), thereby terminating the process.

Figure 13B:
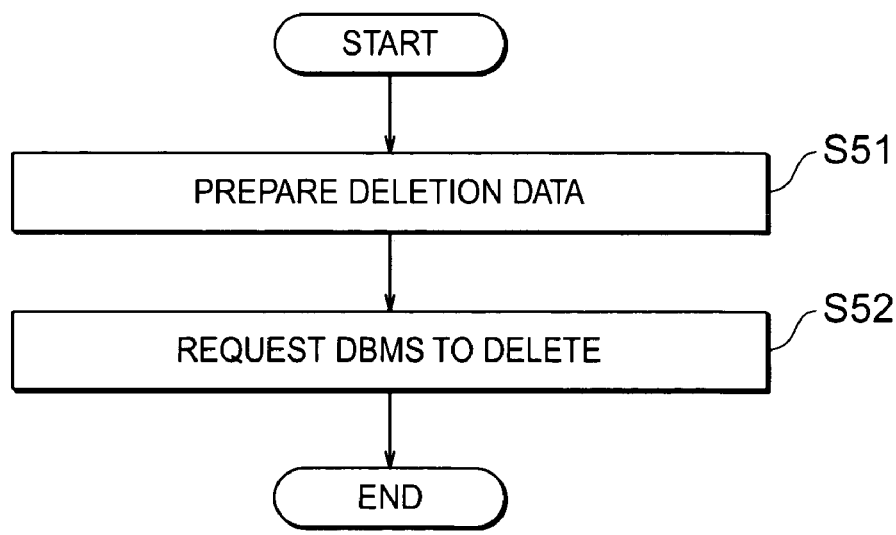

FIG. 13B shows an example of a flow of the log delete processing by the log control unit 21 of the transaction control unit 10. The log control unit 21 prepares deletion data in response to a log deletion request (step S51), and issues a deletion request to the DBMS 14 (step S52), thereby terminating the process.

Figure 14:
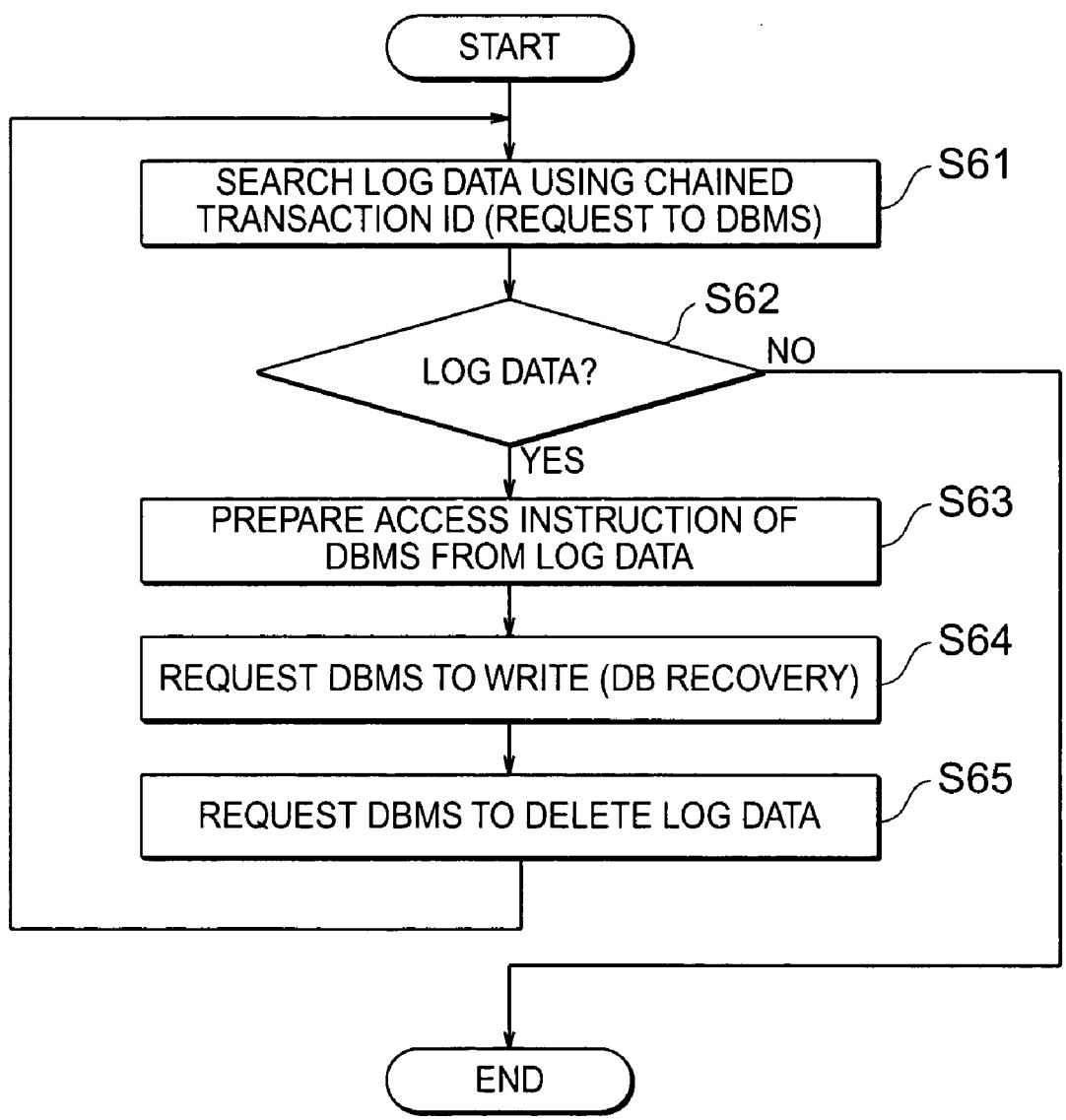
FIG. 14 shows an example of the flow of DB recovery processing by a log control unit.

FIG. 14 shows a display of a flow of the DB recovery processing by the log control unit 21 of the transaction control unit 10 when a database is recovered. The input information when the DB is recovered is a chained transaction ID.

In response to the DB recovery request by input of the chained transaction ID, the log control unit 21 requests the DBMS 14 to search the log data using the chained transaction ID as a key (step S61). When there is no corresponding log data (step S62), then the process terminates.

When there is corresponding log data, an access instruction of the DBMS 14 is prepared from the log data (step S63), and a write request is issued to the DBMS 14 (step S64). As a result of this processing, the DB 140 is restored to the state before update by the chained transactions. Then, a log data delete request is issued to the DBMS 14 (step S65), and control is returned to step S61. The same processing is repeated on all corresponding log data.

Described below is the message routing control of the transaction control unit 10. The message routing control is performed by the message routing control unit 224 of the transaction control unit 10 when the unit 224 receives a routing add/change instruction from the application process 13.

Figure 15:
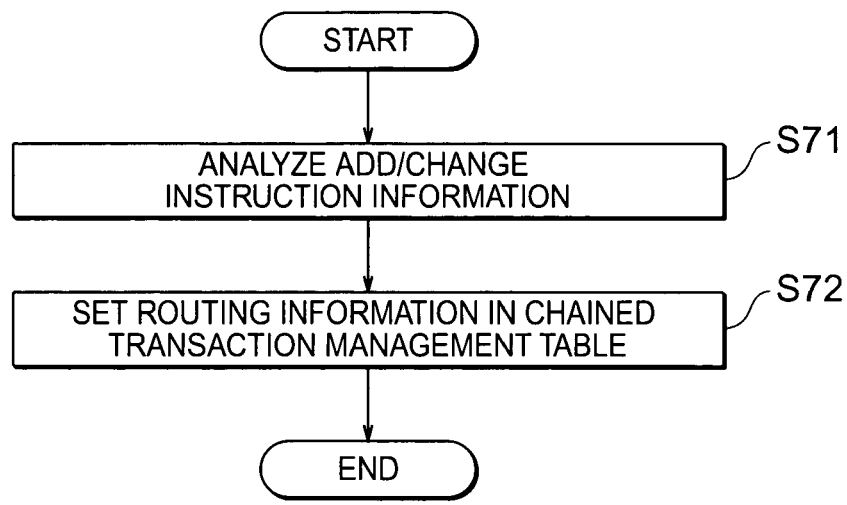
FIG. 15 shows an example of the flow of message routing control processing.
Figure 16:
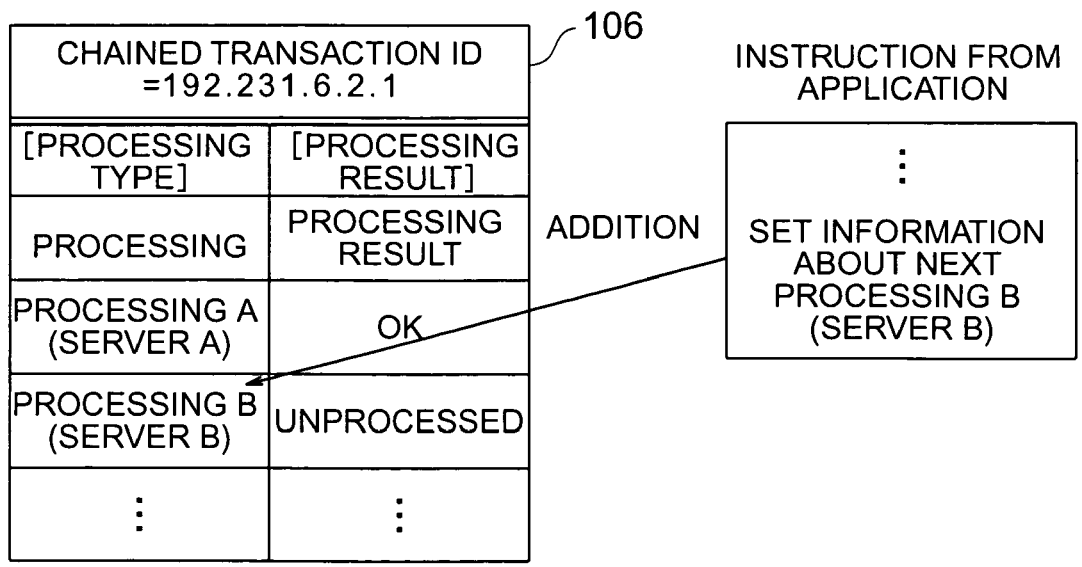
FIG. 16 shows examples of routing add/change processing.

FIG. 15 shows an example of a flow of the message routing control processing. First, routing add/change instruction information received at API from the application process 13 is analyzed (step S71). Based on the analysis result, routing information is set in the chained transaction management table 106 (step S72), and the process terminates. For example, assume that an instruction from the application shown in FIG. 16 is analyzed, and the routing add instruction information "Set information about the next processing B (server B)" is obtained. In this case, in step S72, the information "processing B (server B)" is additionally set in the item "processing type" of the chained transaction management table 106 shown in FIG. 16.

Figure 17:
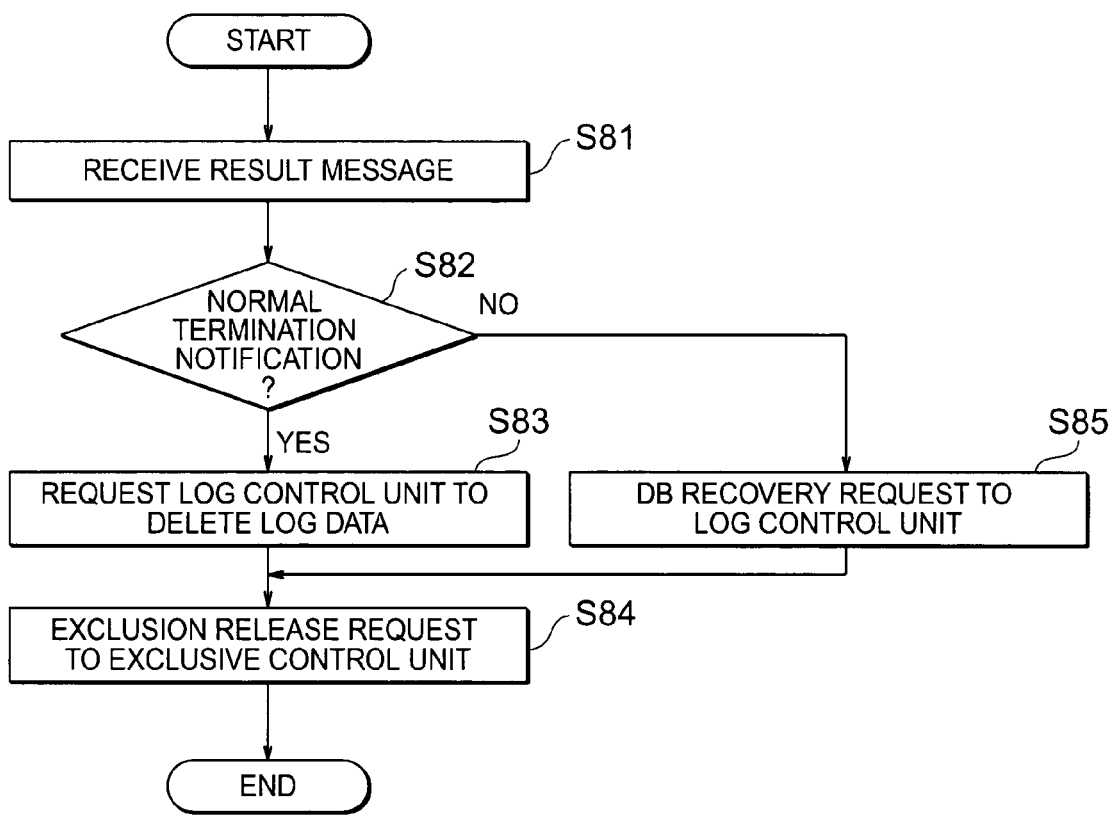
FIG. 17 shows an example of commit processing or DB recovery processing of chained transactions.

FIG. 17 shows an example of a flow of the commit processing of a chained transactions or a flow of the DB recovery processing by the transaction control unit 10. When a result message of chained transactions is received from other servers (step S81), then it is determined which is received a normal termination notification (OK) notifying that the processing has normally terminates or an abnormal termination notification (NG) based on the result message (step S82). When a normal termination notification is received, it indicates that a commit command of chained transactions has been issued, and a log data deletion request is issued to the log control unit 21 with specifying the chained transaction ID in the result message (step S83), and then an exclusion release request is issued to the exclusive control unit 20 (step S84), thereby terminating the process.

When the processing result is "NG", not a normal termination notification in the determination of step S82, then a DB recovery request is issued to the log control unit 21 with specifying the chained transaction ID in the result message (step S85), and an exclusion release request is issued to the exclusive control unit 20 (step S84), thereby terminating the process.

Described below is the integrated data access control. The input information about the present processing is an item name to be accessed, an access request (reference or update) and updated data (when data is updated). The output information is read data (when a read request is issued).

Figure 18:
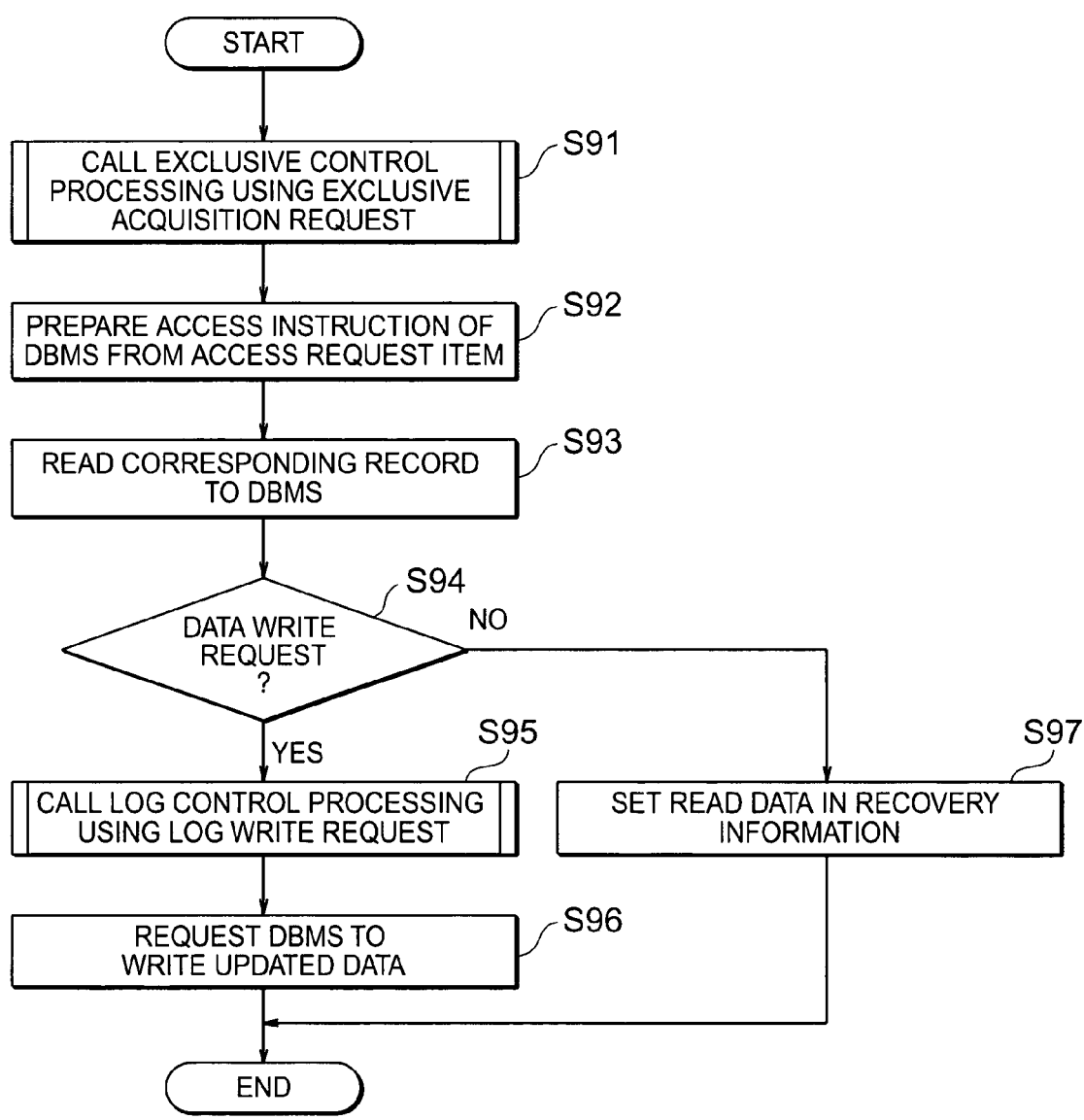
FIG. 18 shows an example of the flow of integrated data access control processing.

FIG. 18 shows an example of a flow of the integrated data access control processing of the integrated data access unit 101. First, the exclusive control processing of the exclusive control unit 20 is called by an exclusive acquisition request calls (step S91). Then, based on the access request item from the application process 13, an access instruction of the DBMS 14 is prepared or constructed (step S92), the prepared access instruction is issued to the DBMS 14, and the corresponding record is read (step S93). When the access request from the application is reference (read request), the read record is read data as output information. When the access request is update (write request), the read record is logged as data before update.

Therefore, it is determined whether the access request is a data write request or a data read request (step S94). When it is a data write request, then a log write request calls the log control processing, the data read in step S93 is recorded in the log file 142 by calling the log control unit 21 (step S95), and a write request is issued to the DBMS 14 to write the updated data (step S96), thereby terminating the process. When the access request is a data read request, the read data is set in the recovery information for passing the application which issued the access request (step S97), thereby terminating the process.

Figure 19:
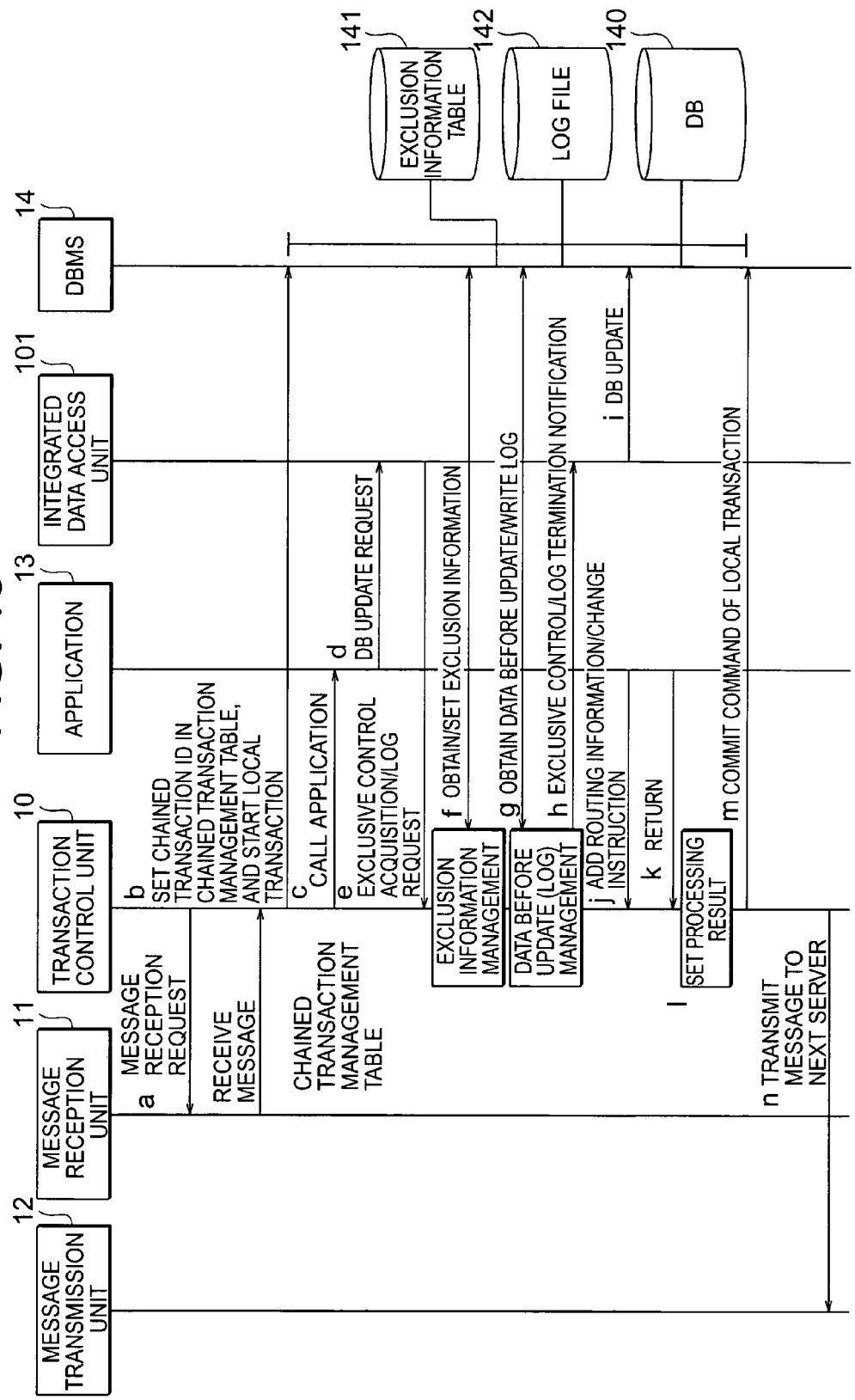
FIG. 19 shows an example of an operation sequence in each server.

FIG. 19 shows an example of an operation sequence in each server when a local transaction is committed. In this example, it is explained based on the sequence "a" to "n" shown in FIG. 19 according to an example of the operation processing in the server A 1.

(a) The transaction control unit 10 requests the message reception unit 11 to send a message, and receives the message 104 from the message reception unit 11.

(b) A chained transaction ID is set in the chained transaction management table 106 of the received message 104, and the start of the local transaction (DB transaction) is stated. When the chained transaction management table 106 is not added to the received message 104, the chained transaction management table 106 is added and then the chained transaction ID is set.

(c) An application is called, and the processing requested in the message 104 is started in the application process 13.

(d) When the application process 13 updates the data of the DB 140, a request to update the data of the DB 140 is issued to the integrated data access unit 101.

(e) The integrated data access unit 101 issues an exclusive acquisition request and a log request to the transaction control unit 10.

(f) to (h) In response to the requests, the transaction control unit 10 confirms that there is no exclusion information about the corresponding updated data in the exclusion information table 141, and sets the exclusion information in the exclusion information table 141. The transaction control unit 10 reads the data before update from the DB 140, and writes the log of the data before update to the log file 142. Then, the transaction control unit 10 notifies the integrated data access unit 101 of the exclusion/log termination.

(i) Upon receipt of the exclusion/log termination notification, the integrated data access unit 101 updates the DB 140 by issuing an SQL statement etc.

(j) Before completion of the processing of the local transaction, the application process 13 notifies the transaction control unit 10 of the add/change instruction of the routing information in the chained transaction management table 106. According to the instruction, the transaction control unit 10 adds/changes the routing information of the chained transaction management table 106.

(k) The processing of an application is terminated, and control is returned to the transaction control unit 10.

(l) After returning from the application, the transaction control unit 10 sets the processing result of the application in the chained transaction management table 106.

(m) When the set processing result is "OK", the transaction control unit 10 issues a commit command of the local transaction to the DBMS 14.

(n) The transaction control unit 10 instructs the message transmission unit 12 to transmit a message to the server in which the next processing is to be performed based on the setting contents of the chained transaction management table 106. When the current processing server has performed the last transaction processing, a result message indicating a commit command of the chained transactions is transmitted to all servers which have performed processing before the current processing server.

Figure 20:
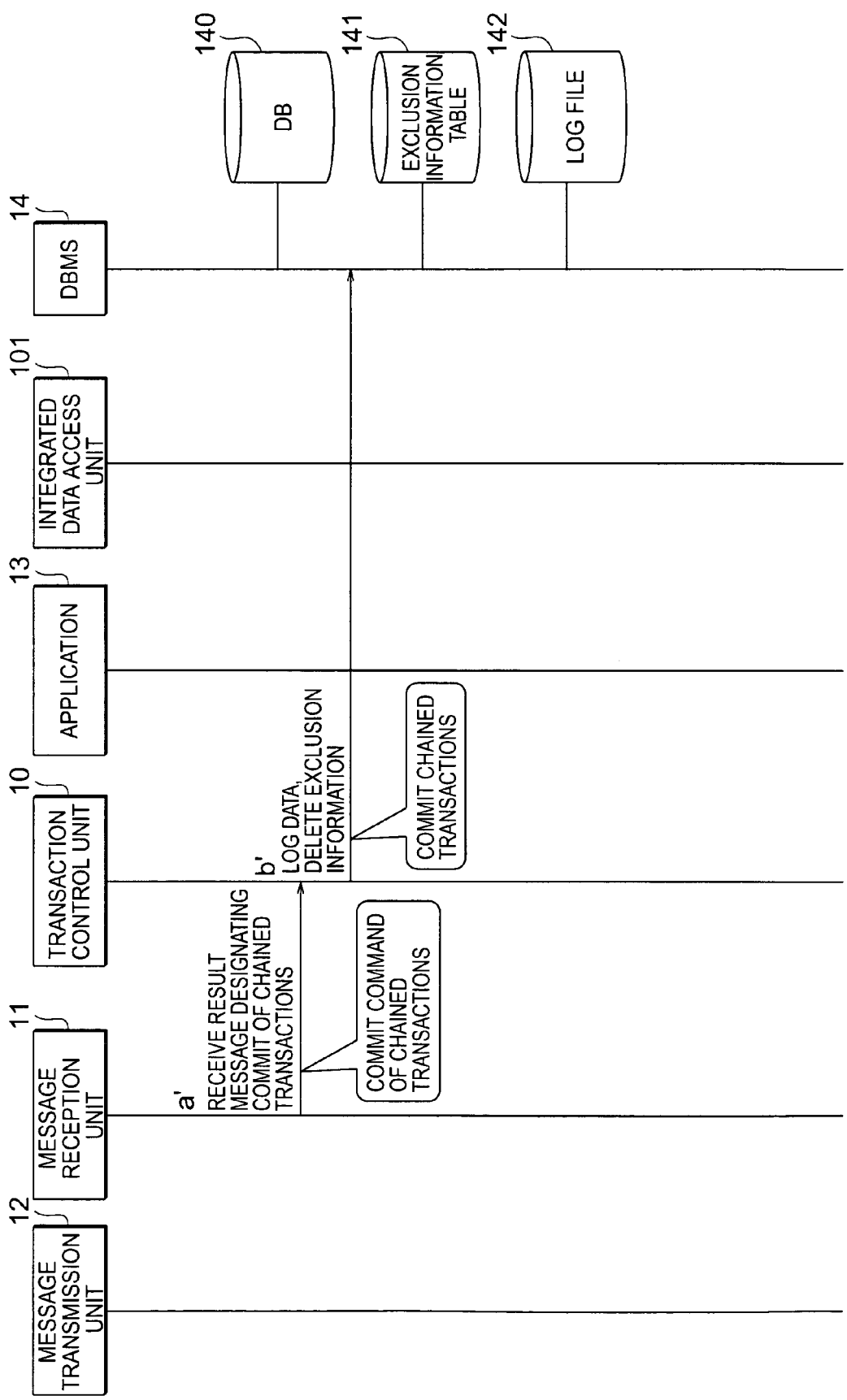
FIG. 20 shows an example of an operation sequence in each server.

FIG. 20 shows an example of the operation sequence in each server when chained transactions are committed. The following processing (a') and (b') is performed in asynchronization with the processing of an application.

(a') The transaction control unit 10 receives a result message indicating the commitment of the chained transactions.

(b') Upon receipt of a result message indicating the commitment, the transaction control unit 10 deletes the log data of the corresponding chained transactions from the log file 142, and deletes the exclusion information about the corresponding chained transactions from the exclusion information table 141.

The explained below is the processing performed when the server goes down during the chained transactions, and then the server is reactivated, according to the embodiment of the present invention. When the server goes down during the processing of the chained transactions, the subsequent behavior (continuing processing/rollback) depends on the execution status of the processing. For example, assume that the server B 2 goes down during processing in the server C 3 in the chained transactions of processing in the order of the server A 1, the server B 2, and the server C 3.

In this case, since the processing in the server B 2 is completed, the server B 2 awaits a result message after the reactivation, and follows the instruction (OK/NG) of the result message.

When the server C 3 goes down, the subsequent behavior depends on whether or not the server C 3 was performing processing then. For example, when the server C 3 goes down without performing processing at all although there is the message 104 in the message reception unit 11, then the server C 3 can perform the processing according to the message 104 after the activation of the system following the server down. When the server C 3 goes down during the processing in the server C 3, then the recovery processing is required on the transaction being processed when the server goes down.

To determine whether or not the processing is being performed when the server C 3 goes down, the exclusion information table 141 is searched using the chained transaction ID. When there is exclusion information about the chained transaction ID, it is determined that the server C 3 goes down during the processing, and the processing performed in the server C 3 is temporarily rolled back (DB recovery from the log data).

At this time, whether or not the chained transactions themselves are to be rolled back is up to the user. When the chained transactions themselves are to be rolled back, a result message indicating an abnormal condition (down) has occurred during the processing and the processing result is "NG" is to be transmitted to the server related to the chained transaction processing. When the processing is to be continued, a message is read again, and the processing can be performed. The processing up to this point is performed in the initial processing in the re-initialization after the system down.

Figure 21:
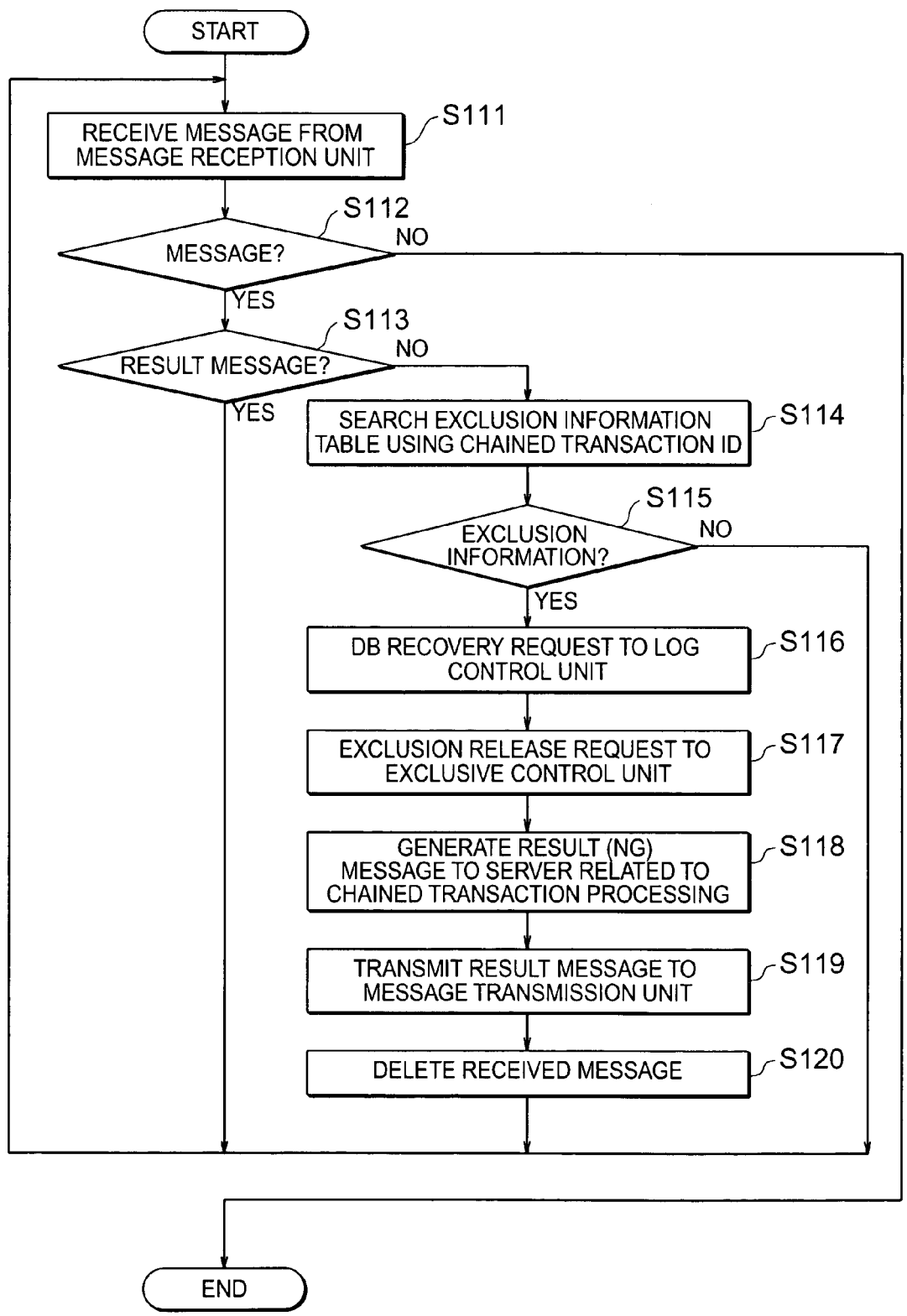
FIG. 21 shows an example of a flow of initial processing by a server when the system is reactivated after it goes down.

FIG. 21 shows an example of a flow of the initial processing in a server when the server goes down during the processing in the chained transactions, and the activation is performed after it goes down.

First, a message is received from the message reception unit 11 (step S111). Then it is determined whether or not there is a message in the message reception unit 11 (step S112). When there is no message, the process terminates. When there is a message, it is determined whether or not it is a result message (step S113).

When it is a result message, then control is returned to step S111, and receive processing is performed on the next message from the message reception unit 11. When it is not a result message, but the message 104 of a request to process chained transactions, then a search is made of exclusive information table 141 using the chained transaction ID in the message 104 as a key (step S114), and it is determined whether or not there is exclusion information (step S115).

When there is no exclusion information, it is assumed that the server has gone down when no processing is performed, and control is returned to step S111.

When there is exclusion information, it is assumed that processing was being performed when the server went down. Therefore, a DB recovery request is issued to the log control unit 21 (step S116), and an exclusion release request is issued to the exclusive control unit 20 (step S117).

Then, a result (NG) message for the server related to the chained transaction processing is generated (step S118). In this case, the result message indicates the recovery of the database in the server related to the chained transactions, and is used for rollback of the chained transactions. The result message is configured by the information about the chained transaction ID and the information (NG) that an abnormal condition (down) has occurred during the processing in the current processing server. The result message is transmitted to the message transmission unit 12 (step S119), the result message is deleted (step S120), and control is returned to step S111.

After the message reception unit 11 performs the above-mentioned processing on all received messages (step S112), the initial processing after the reactivation terminates. Then, the normal transaction management processing shown in FIG. 5 is performed. At this time, the message received by the transaction control unit 10 from the message reception unit 11 and processed in the initial processing shown in FIG. 21 is not set as received, but is set as reception target, and each message 104 is processed, excluding the message deleted in step S120.

By the system explained above, the consistency/integrity of the data processing by a plurality of servers can be guaranteed, and the throughput of the entire system and the response of the transaction processing can be improved.

The processing of the chained transactions according to the present invention can be realized by a computer of each server and a software program, and the program can be provided after being recorded in a computer-readable recording medium, or can be provided over a network.

According to the present invention, it is not necessary to keep synchronization among a series of processes of the servers related to chained transactions, and the multiprocessing level can be enhanced and the throughput of the transaction in the entire system can be improved by asynchronously operating the database access processing of each server.

Furthermore, according to the present invention, since the frequency of communications up to the commitment of transactions can be remarkably reduced as compared with the conventional technology. Therefore, the response of the transactions can be improved in the distributed transaction processing.

What is claimed is:

1. A transaction processing method for processing a transaction at a plurality of servers, the method comprising:

managing information at a managing table to process a first transaction as a chain of a plurality of second transactions, the first transaction being processed at the plurality of servers each of which has a database, the information indicating an order of executing of processing of the plurality of second transactions and a server in which each of the plurality of second transactions is executed;

executing processing of the plurality of second transactions at the plurality of servers according to the information, each of the plurality of second transactions individually being processed at a server indicated in the information to update a database, thereby the first transaction is executed; and releasing, when a second transaction executed at a server indicated in the information is completed, a right to execute the second transaction at the server indicated in the information without waiting for synchronous completion of the plurality of second transactions at the plurality of servers, and wherein each of the processing of the plurality of second transactions in which one of the plurality of second transaction is executed further comprises:

recording exclusion information for data of the database to be accessed in the second transaction which is executed at a server indicated in the information;

executing exclusive control on the data of the database with the other of the plurality of second transactions; and storing the data before update in the second transaction, wherein, when the processing of the plurality of second transactions normally terminates, the recorded exclusion information and the stored data before update are discarded, and wherein, when one of the processing of the plurality of second transactions abnormally terminates, the database is restored based on the stored data before update.

2. The transaction processing method according to claim 1, further comprising:

assigning a chained transaction identifier to the first transaction to uniquely identify the first transaction at the plurality of servers prior to the processing of the plurality of second transactions, executing message communication among the plurality of servers in the processing of the plurality of second transactions, the message being added the chained transaction identifier and information of processing and a processing result thereof at a server in which a second transaction is executed.

3. The transaction processing method according to claim 1, wherein, when the processing of the plurality of second transactions normally terminates, a server of the plurality of servers in which last one of the plurality of second transactions is executed based on the information communicates with the other servers of the plurality of servers in which the other of the plurality of second transactions is executed based on the information to discard the recorded exclusion information and the stored data before update.

4. The transaction processing method according to claim 1, wherein, when one of the processing of the plurality of second transactions abnormally terminates, a server of the plurality of servers in which the abnormally terminated second transaction is executed based on the information communicates with the other servers of the plurality of servers in which the other of the plurality of second transactions is executed based on the information to restore the database based on the stored data before update and to discard the recorded exclusion information and the stored data before update.

5. A transaction processing apparatus for processing a transaction the apparatus comprising:
a plurality of servers each of which has a database;
managing means for managing information to process a first transaction as a chain of a plurality of second transactions, the first transaction being processed at the plurality of servers, the information indicating an order of executing of processing of the plurality of second transactions and a server in which each of the plurality of second transactions is executed;
executing means for executing processing of the plurality of second transactions according to the information, each of the plurality of second transactions individually being processed at a server indicated in the information to update a database thereby the first transaction is executed;
transaction management means for releasing, when a second transaction executed at a server indicated in the information is completed, a right to execute the second transaction at the server indicated in the information without waiting for synchronous completion of the plurality of second transactions at the plurality of servers;
exclusive control means for recording exclusion information for data of the database to be accessed in the second transaction which is executed at a server indicated in the information, executing exclusive control on the data of the database with the other of the plurality of second transactions, discarding the recorded exclusion information and releasing the exclusive control when the processing of the plurality of second transactions is completed; and
log control means for storing the data before update in each of the plurality of second transactions, discarding the stored data before update when the processing of the plurality of second transactions normally terminates, and restoring the database based on the stored data before update when one of the processing of the plurality of second transactions abnormally terminates, and
wherein each of the processing of the plurality of second transactions in which one of the plurality of second transaction is executed further comprises:
recording exclusion information for data of the database to be accessed in the second transaction which is executed at a server indicated in the information;

executing exclusive control on the data of the database with the other of the plurality of second transactions; and
storing the data before update in the second transaction,
wherein, when the processing of the plurality of second transactions normally terminates, the recorded exclusion information and the stored data before update are discarded, and
wherein, when one of the processing of the plurality of second transactions abnormally terminates, the database is restored based on the stored data before update.

6. A computer-readable recording medium recording a transaction control program for processing a transaction at a plurality of servers, the program causing a computer to execute the steps comprising:
managing information at a managing table to process a first transaction as a chain of a plurality of second transactions, the first transaction being processed at the plurality of servers each of which has a database, the information indicating an order of executing of processing of the plurality of second transactions and a server in which each of the plurality of second transactions is executed;
executing processing of the plurality of second transactions according to the information, each of the plurality of second transactions individually being processed at a server indicated in the information to update a database, thereby the first transaction is executed; and
releasing, when a second transaction executed in a server indicated in the information is completed, a right to execute the second transaction at the server indicated in the information without waiting for synchronous completion of the plurality of second transactions at the plurality of servers, and
wherein each of the processing of the plurality of second transactions in which one of the plurality of second transaction is executed further comprises:
recording exclusion information for data of the database to be accessed in the second transaction which is executed at a server indicated in the information;
executing exclusive control on the data of the database with the other of the plurality of second transactions; and
storing the data before update in the second transaction,
wherein, when the processing of the plurality of second transactions normally terminates, the recorded exclusion information and the stored data before update are discarded, and
wherein, when one of the processing of the plurality of second transactions abnormally terminates, the database is restored based on the stored data before update.

* * * * *